US012498012B2

(12) United States Patent
Suka et al.

(10) Patent No.: US 12,498,012 B2
(45) Date of Patent: Dec. 16, 2025

(54) SOLENOID, DAMPING FORCE ADJUSTMENT MECHANISM, AND DAMPING FORCE ADJUSTABLE SHOCK ABSORBER

(71) Applicant: Hitachi Astemo, Ltd., Hitachinaka (JP)

(72) Inventors: Ryuichi Suka, Hitachinaka (JP); Milton Muzvidziwa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 608 days.

(21) Appl. No.: 17/913,025

(22) PCT Filed: Mar. 17, 2021

(86) PCT No.: PCT/JP2021/010774
§ 371 (c)(1),
(2) Date: Sep. 20, 2022

(87) PCT Pub. No.: WO2021/215148
PCT Pub. Date: Oct. 28, 2021

(65) Prior Publication Data
US 2023/0144713 A1 May 11, 2023

(30) Foreign Application Priority Data
Apr. 22, 2020 (JP) .................. 2020-076114

(51) Int. Cl.
*F16F 9/34* (2006.01)
*F16F 9/19* (2006.01)
(Continued)

(52) U.S. Cl.
CPC .............. *F16F 9/19* (2013.01); *F16F 9/34* (2013.01); *F16F 9/44* (2013.01); *F16K 31/06* (2013.01); *H01F 7/1607* (2013.01)

(58) Field of Classification Search
CPC ........ F16F 9/19; F16F 9/34; F16F 9/44; H01F 7/1607; H01F 7/16; H02K 33/02
(Continued)

(56) References Cited

U.S. PATENT DOCUMENTS

| 2009/0140189 A1 | 6/2009 | Kokubu et al. |
| 2018/0266514 A1* | 9/2018 | Mori ............... H01F 7/1607 |

(Continued)

FOREIGN PATENT DOCUMENTS

| JP | 2009-127692 | 6/2009 |
| JP | 2014-73018 | 4/2014 |

(Continued)

OTHER PUBLICATIONS

International Search Report issued Jun. 1, 2021 in corresponding International Application No. PCT/JP2021/010774, with English language translation.

(Continued)

Primary Examiner — Christopher P Schwartz
(74) Attorney, Agent, or Firm — Wenderoth, Lind & Ponack, L.L.P.

(57) ABSTRACT

A solenoid includes a stator at a position facing an opening of a housing member. The stator includes a conical protrusion portion and a side surface made from a magnetic body. The side surface extends from an outer periphery of a reduced diameter portion in a direction away from the opening of the housing member. The solenoid includes a yoke with a fixation hole having an inner peripheral surface to which a part of a side surface portion of the stator is fixed. A non-contact portion, where the yoke and the side surface portion are out of contact with each other, is defined on a housing member side of the fixation hole. The solenoid includes a non-magnetic connection member joined by being heated between the housing member and the yoke, and a movable element which is axially movable in the housing member and made from a magnetic body.

7 Claims, 5 Drawing Sheets

(51) Int. Cl.
  *F16F 9/44* (2006.01)
  *F16K 31/06* (2006.01)
  *H01F 7/16* (2006.01)

(58) Field of Classification Search
  USPC ......... 137/625.65–625.69; 188/266.2, 266.5, 188/266.6, 322.2
  See application file for complete search history.

(56) References Cited

U.S. PATENT DOCUMENTS

| | | |
|---|---|---|
| 2019/0108934 A1 | 4/2019 | Nagasaki et al. |
| 2023/0032430 A1* | 2/2023 | Mori ........................ F16F 9/50 |
| 2023/0343499 A1* | 10/2023 | Iida ........................ F16F 9/461 |

FOREIGN PATENT DOCUMENTS

| | | | |
|---|---|---|---|
| JP | 2014-129842 | 7/2014 | |
| JP | 2017-118124 | 6/2017 | |
| JP | 6383021 B2 * | 8/2018 | ................ F16F 9/46 |
| JP | 2019-71378 | 5/2019 | |

OTHER PUBLICATIONS

Written Opinion of the International Searching Authority issued Jun. 1, 2021 in corresponding International Application No. PCT/JP2021/010774, with English language translation.

* cited by examiner

SOLENOID, DAMPING FORCE ADJUSTMENT MECHANISM, AND DAMPING FORCE ADJUSTABLE SHOCK ABSORBER

CROSS-REFERENCE TO RELATED APPLICATIONS

The present application claims priority under the Paris Convention to Japanese Patent Application No. 2020-076114 filed on Apr. 22, 2020. The entire disclosure of Japanese Patent Application No. 2020-076114 including the specification, the claims, the drawings, and the abstract is incorporated herein by reference in its entirety.

TECHNICAL FIELD

The present disclosure relates to a solenoid, a damping force adjustment mechanism, and a damping force adjustable shock absorber used to adjust a damping force to, for example, damp a vibration of a vehicle.

BACKGROUND ART

Generally, suspension apparatuses such as semi-active suspensions mounted on vehicles are equipped with a damping force adjustable shock absorber configured to variably adjust a damping force according to, for example, the running condition and the behavior of the vehicle. Then, one known type of the damping force adjustable shock absorber is a shock absorber using a solenoid as an electromagnetic actuator for variably adjusting the damping force. Further, a solenoid is also used for an electromagnetic valve that, for example, controls a hydraulic pressure as an electromagnetic actuator for controlling opening and closing of the valve.

For example, as this type of solenoid, Japanese Patent Application Publication No. 2009-127692 (hereinafter, "JP 2009-127692") discusses a solenoid including a coil that generates a magnetic force in reaction to power supply, a housing and a yoke disposed on the inner peripheral side of this coil and made from a magnetic body (first and second fixed iron cores), a connection member (a non-magnetic member) axially connecting the housing and yoke therebetween and made from a non-magnetic body, and a movable element (an armature) disposed on the inner peripheral sides of the housing, yoke, and non-magnetic member and provided axially movably.

Further, JP 2009-127692 discusses that a brazing method is used to join the non-magnetic member between the housing and the yoke. In this case, after the non-magnetic member is joined between the housing and the yoke by the brazing, cutting processing may be applied in such a manner that the inner peripheral surface thereof is shaped into a stepless circumferential surface. By this processing, JP 2009-127692 allows the solenoid to improve the slidability of the movable element on the inner peripheral surface.

SUMMARY OF INVENTION

Technical Problem

Then, the solenoid configured as indicated in JP 2009-127692 includes the non-magnetic member joined between the housing and the yoke (the first and second fixed iron cores), thereby achieving an increase in the magnetic flux density of the magnetic circuit with respect to the movable element due to the non-magnetic member. However, the non-magnetic member involves such a problem that applying mechanical processing (for example, the processing of cutting the inner peripheral surface) after the joining leads to a change in the magnetic characteristic due to an influence of heat, thereby facilitating the magnetization of the non-magnetic member.

An object of one aspect of the present invention is to provide a solenoid, a damping force adjustment mechanism, and a damping force adjustable shock absorber configured to be able to maintain a high magnetic flux density with respect to a movable element between a housing (i.e., a housing member) and a yoke and maintain an excellent thrust force characteristic, and also improve workability at the time of assembling.

Solution to Problem

According to one aspect of the present invention, a solenoid includes a coil wound annularly and configured to generate a magnetic force in reaction to power supply, and a housing member disposed on an inner periphery of the coil. The housing member extends in a direction of a winding axis of the coil. The housing member includes a housing portion opened on one end side thereof, and is made from a magnetic body. The solenoid further includes a movable element provided in the housing portion movably in the direction of the winding axis of the coil and made from a magnetic body, and a stator provided at a position facing the opening of the housing portion. The stator includes a reduced diameter portion and a side surface portion integrally made from a magnetic body. The reduced diameter portion has an outer diameter reducing as it is approaching the opening of the housing portion. The side surface portion extends from an outer periphery of the reduced diameter portion in a direction away from the opening of the housing portion. The solenoid further includes a yoke including a fixation hole having an inner peripheral surface to which a part of the side surface portion of the stator is fixed. A non-contact portion, where the yoke and the side surface portion of the stator are out of contact with each other, is formed on the housing member side of the fixation hole.

According to one aspect of the present invention, a damping force adjustment mechanism includes a coil wound annularly and configured to generate a magnetic force in reaction to power supply, and a housing member disposed on an inner periphery of the coil. The housing member extends in a direction of a winding axis of the coil. The housing member includes a housing portion opened on one end side thereof, and is made from a magnetic body. The damping force adjustment mechanism further includes a movable element provided in the housing portion movably in the direction of the winding axis of the coil and made from a magnetic body, a control valve configured to be controlled according to a movement of the movable element, and a stator provided at a position facing the opening of the housing portion. The stator includes a reduced diameter portion and a side surface portion integrally made from a magnetic body. The reduced diameter portion has an outer diameter reducing as it is approaching the opening of the housing portion. The side surface portion extends from an outer periphery of the reduced diameter portion in a direction away from the opening of the housing portion. The damping force adjustment mechanism further includes a yoke including a fixation hole having an inner peripheral surface to which a part of the side surface portion of the stator is fixed. A non-contact portion, where the yoke and the side surface portion of the stator are out of contact with each other, is formed on the housing member side of the fixation hole.

According to one aspect of the present invention, a damping force adjustable shock absorber includes a cylinder sealingly containing hydraulic fluid therein, a piston provided slidably in the cylinder, a piston rod coupled with the piston and extending out of the cylinder, and a damping force adjustment mechanism configured to generate a damping force by controlling a flow of the hydraulic fluid that is generated according to a sliding movement of the piston in the cylinder. The damping force adjustment mechanism includes a coil wound annularly and configured to generate a magnetic force in reaction to power supply, and a housing member disposed on an inner periphery of the coil. The housing member extends in a direction of a winding axis of the coil. The housing member includes a housing portion opened on one end side thereof, and is made from a magnetic body. The damping force adjustment mechanism further includes a movable element provided in the housing portion movably in the direction of the winding axis of the coil and made from a magnetic body, a control valve configured to be controlled according to a movement of the movable element, and a stator provided at a position facing the opening of the housing portion. The stator includes a reduced diameter portion and a side surface portion integrally made from a magnetic body. The reduced diameter portion has an outer diameter reducing as it is approaching the opening of the housing portion. The side surface portion extends from an outer periphery of the reduced diameter portion in a direction away from the opening of the housing portion. The damping force adjustment mechanism further includes a yoke including a fixation hole having an inner peripheral surface to which a part of the side surface portion of the stator is fixed. A non-contact portion, where the yoke and the side surface portion of the stator are out of contact with each other, is formed on the housing member side of the fixation hole.

Therefore, according to the aspects of the present embodiment, it becomes possible to maintain a high magnetic flux density passing through the movable element between the housing member and the yoke (the stator) and maintain an excellent thrust force characteristic, and can also improve the workability at the time of the assembling.

DESCRIPTION OF EMBODIMENTS

In the following description, solenoids, damping force adjustment mechanisms, and damping force adjustable shock absorbers according to embodiments of the present invention will be described in detail with reference to FIGS. 1 to 7, citing examples in which they are applied to a damping force adjustable hydraulic shock absorber.

Figure 1:
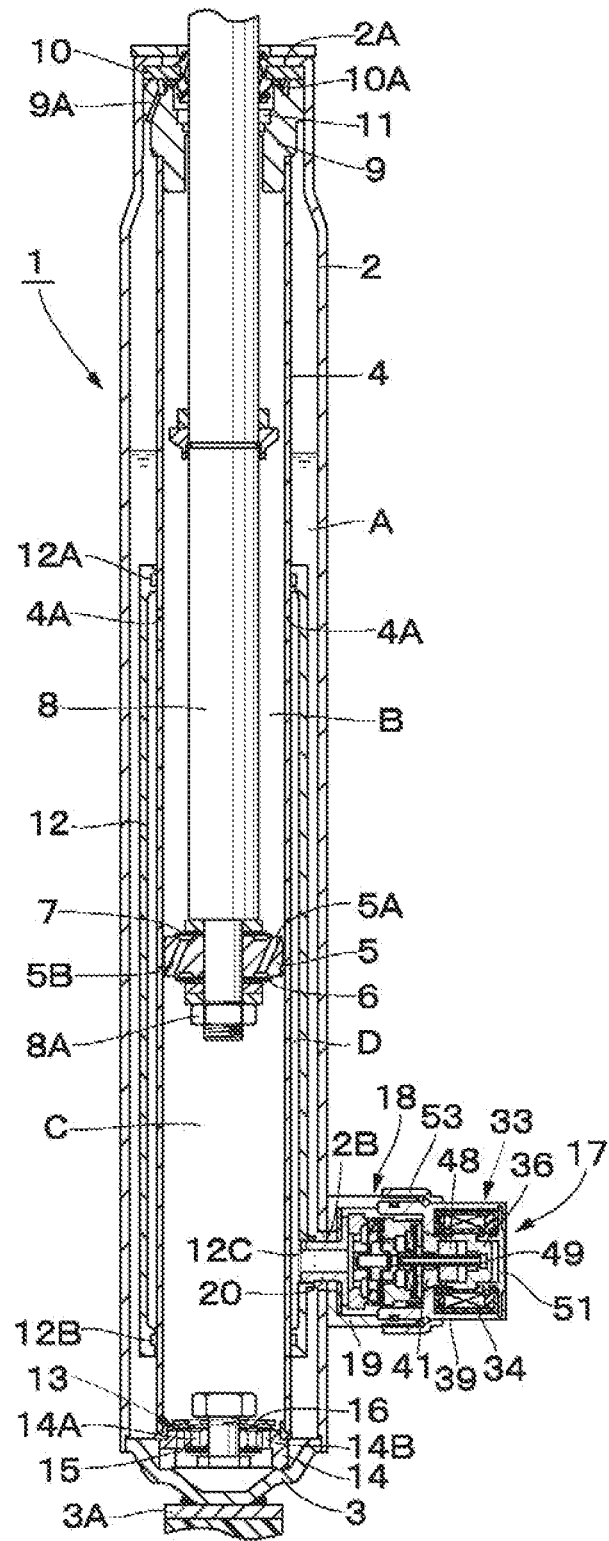
FIG. 1 is a vertical cross-sectional view illustrating a damping force adjustable shock absorber in which a solenoid according to a first embodiment is provided.

Now, FIGS. 1 to 4 illustrate a first embodiment. In FIG. 1, a damping force adjustable hydraulic shock absorber 1 (hereinafter referred to as a hydraulic shock absorber 1) is equipped with a solenoid 33, which will be described below. This hydraulic shock absorber 1 includes an outer tube 2, an inner tube 4, a piston 5, a piston rod 8, a rod guide 9, a damping force adjustment mechanism 17, and the like. In the following description, the first embodiment will be described, assuming that, for example, one axial side of the outer tube 2 and the inner tube 4 is a lower side, a lower portion side, or a lower end side, and an opposite axial side is an upper side, an upper portion side, or an upper end side.

The bottomed cylindrical outer tube 2, which forms the outer shell of the hydraulic shock absorber 1, has a lower end side closed by a bottom cap 3, and an upper end side formed as a radially inward bent crimped portion 2A. The rod guide 9 and a seal member 10 are provided between the crimped portion 2A and the inner tube 4. On the other hand, an opening 2B is formed on the lower portion side of the outer tube 2 concentrically with a connection port 12C of an intermediate tube 12, which will be described below, and the damping force adjustment mechanism 17, which will be described below, is attached so as to face this opening 2B. Further, a mounting eye 3A, which is attached to, for example, a wheel side of a vehicle, is provided on the bottom cap 3.

The inner tube 4 is provided in the outer tube 2 coaxially with this outer tube 2. This inner tube 4 has a lower end side fittedly attached to a bottom valve 13 and an upper end side fittedly attached to the rod guide 9. Hydraulic liquid as hydraulic fluid is sealingly contained in the inner tube 4, which forms a cylinder together with the outer tube 2. The hydraulic liquid is not limited to oil liquid and oil, and may be, for example, water containing an additive mixed therein.

An annular reservoir chamber A is formed between the inner tube 4 and the outer tube 2, and gas is sealingly contained in this reservoir chamber A together with the hydraulic liquid. This gas may be air in an atmospheric pressure state, or gas such as compressed nitrogen gas may be used as it. Further, the inner tube 4 is pierced to form an oil hole 4A radially at an intermediate position of the inner tube 4 in the length direction (the axial direction) thereof. The oil hole 4A establishes constant communication of a rod-side oil chamber B with an annular oil chamber D.

The piston 5 is slidably fittedly inserted in the inner tube 4. The piston 5 divides the inside of the inner tube 4 into two chambers, a rod-side chamber (the rod-side oil chamber B) and a bottom-side chamber (a bottom-side oil chamber C). A plurality of oil passages 5A and a plurality of oil passages 5B are each formed on the piston 5 at circumferential intervals. The oil passages 5A and 5B can establish communication between the rod-side oil chamber B and the bottom-side oil chamber C.

Then, an extension-side disk valve 6 is provided on the lower end surface of the piston 5. The extension-side disk valve 6 is opened upon exceedance of the pressure in the rod-side oil chamber B over a relief setting pressure when the piston 5 is slidably displaced upward during an extension stroke of the piston rod 8, and relieves the pressure at this time into the bottom-side oil chamber C side via each of the oil passages 5A. This relief setting pressure is set to a higher pressure than a valve-opening pressure when the damping force adjustment mechanism 17, which will be described below, is set to the hard side.

A compression-side check valve 7 is provided on the upper end surface of the piston 5. The compression-side check valve 7 is opened when the piston 5 is slidably displaced downward during a compression stroke of the piston rod 8, and otherwise is closed. This check valve 7 functions to permit a flow of the oil liquid in the bottom-side oil chamber C through each of the oil passages 5B toward the rod-side oil chamber B, and prohibit a flow of the oil liquid in the opposite direction therefrom. The valve-opening pressure of this check valve 7 is set to a lower pressure than a valve-opening pressure when the damping force adjustment mechanism 17, which will be described below, is set to the soft side, and the check valve 7 generates substantially no damping force. Generating substantially no damping force here means a force equal to or weaker than friction of the piston 5 and the seal member 10, and not affecting a motion of the vehicle.

The piston rod 8 extends axially (vertically) in the inner tube 4. The piston rod 8 is provided in such a manner that the lower end side thereof is inserted in the inner tube 4 and is fixedly attached to the piston 5 with use of a nut 8A and the like. Further, the upper end side of the piston rod 8 protrudes so as to extend out of the outer tube 2 and the inner tube 4 via the rod guide 9.

The stepped cylindrical rod guide 9 is provided on the upper end side of the inner tube 4. The rod guide 9 positions the upper portion of the inner tube 4 at the center of the outer tube 2, and also axially slidably guides the piston rod 8 on the inner peripheral side thereof. Further, the annular seal member 10 is provided between the rod guide 9 and the crimped portion 2A of the outer tube 2. The seal member 10 is a member formed by baking an elastic material such as rubber to an annular metallic plate with the piston rod 8 inserted therethrough at the center thereof, and functions to seal between the seal member 10 and the piston rod 8 due to a sliding contact of the inner periphery thereof to the outer peripheral surface of the piston rod 8.

Further, a lip seal 10A is formed on the seal member 10 on the lower surface side. The lip seal 10A extends in contact with the rod guide 9, and serves as a check valve. The lip seal 10A is disposed between an oil pool chamber 11 and the reservoir chamber A, and functions to permit a flow of the oil liquid and the like in the oil pool chamber 11 toward the reservoir chamber A side via a return passage 9A of the rod guide 9 and prohibit a flow in the opposite direction therefrom.

The intermediate tube 12, which is a tubular member, is arranged between the outer tube 2 and the inner tube 4. This intermediate tube 12 is, for example, attached to the outer peripheral side of the inner tube 4 via upper and lower tubular seals 12A and 12B. The intermediate tube 12 forms therein the annular oil chamber D extending so as to surround the outer peripheral side of the inner tube 4 throughout the entire circumference thereof, and the annular oil chamber D is prepared as an oil chamber independent of the reservoir chamber A. The annular oil chamber D is in constant communication with the rod-side oil chamber B via the radial oil hole 4A formed through the inner tube 4. The annular oil chamber D serves as a flow passage through which a flow of the hydraulic liquid is generated due to a movement of the piston rod 8. Further, the connection port 12C is provided on the lower end side of the intermediate tube 12. A connection tubular member 20 of a damping force adjustment valve 18, which will be described below, is attached to the connection port 12C.

The bottom valve 13 is provided between the bottom cap 3 and the inner tube 4 while being located on the lower end side of the inner tube 4. The bottom valve 13 includes a valve body 14, a compression-side disk valve 15, and an extension-side check valve 16. The valve body 14 defines the reservoir chamber A and the bottom-side oil chamber C between the bottom cap 3 and the inner tube 4. The compression-side disk valve 15 is provided on the lower surface side of the valve body 14. The extension-side check valve 16 is provided on the upper surface side of the valve body 14. Oil passages 14A and 14B are each formed on the valve body 14 at circumferential intervals. The oil passages 14A and 14B can establish communication between the reservoir chamber A and the bottom-side oil chamber C.

The compression-side disk valve 15 is opened upon exceedance of the pressure in the bottom-side oil chamber C over a relief setting pressure when the piston 5 is slidably displaced downward during the compression stroke of the piston rod 8, and relieves the pressure at this time into the reservoir chamber A side via each of the oil passages 14A. This relief setting pressure is set to a higher pressure than the valve-opening pressure when the damping force adjustment mechanism 17, which will be described below, is set to the hard side.

The extension-side check valve 16 is opened when the piston 5 is slidably displaced upward during the extension stroke of the piston rod 8, and otherwise is closed. This extension-side check valve 16 functions to permit a flow of the oil liquid in the reservoir chamber A through each of the oil passages 14B toward the bottom-side oil chamber C, and prohibit a flow of the oil liquid in the opposite direction therefrom. The valve-opening pressure of the extension-side check valve 16 is set to a lower pressure than the valve-opening pressure when the damping force adjustment mechanism 17, which will be described below, is set to the soft side, and the extension-side check valve 16 generates substantially no damping force.

Figure 2:
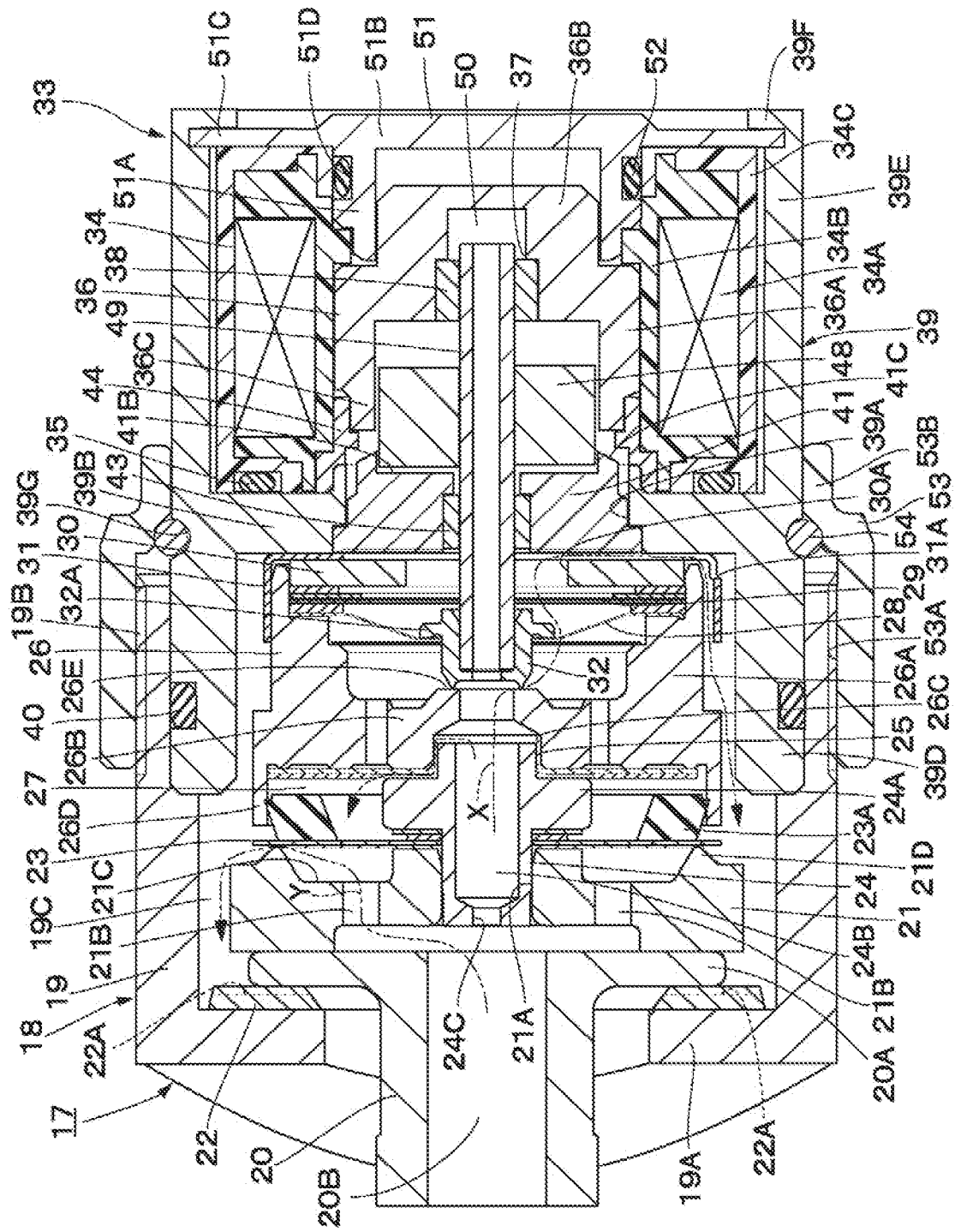
FIG. 2 is a cross-sectional view illustrating a damping force adjustment valve and the solenoid in FIG. 1 in an enlarged manner.

Next, the damping force adjustment mechanism 17 will be described with reference to FIGS. 1 and 2. This damping force adjustment mechanism 17 is a mechanism that generates the damping force by controlling a flow of the hydraulic liquid generated due to the sliding movement of the piston 5 in the cylinder (the inner tube 4), and also variably adjusts the damping force to be generated by the hydraulic shock absorber 1. FIG. 2 illustrates the damping force adjustment mechanism 17 with a movable element 48 (an actuation pin 49) moved to the left side in FIG. 2 (i.e., a valve-closing direction in which a pilot valve member 32 is seated on a valve seat portion 26E of a pilot body 26) according to power supply from outside to a coil 34A of a solenoid 33 (for example, control of generating a hard damping force).

As also illustrated in FIG. 1, the damping force adjustment mechanism 17 is disposed in such a manner that the proximal end side (the left end side in FIG. 1) thereof is interposed between the reservoir chamber A and the annular oil chamber D, and the distal end side (the right end side in FIG. 1) thereof protrudes radially outward from the lower portion side of the outer tube 2. The damping force adjustment mechanism 17 includes the damping force adjustment valve 18 and the solenoid 33, which will be described below. The damping force adjustment valve 18 serves as a control valve that generates a damping force having the hard or soft characteristic by variably controlling the flow of the oil liquid from the annular oil chamber D to the reservoir chamber A. The solenoid 33 adjusts valve-opening and closing operations of this damping force adjustment valve 18.

In other words, the valve-opening pressure of the damping force adjustment valve 18 is adjusted by the solenoid 33 used as a damping force variable actuator, and the generated damping force is variably controlled to the hard or soft characteristic thereby. The damping force adjustment valve 18 is a valve configured in such a manner that the valve-opening and closing operations thereof are adjusted by the solenoid 33, and is equipped with a flow passage where the flow of the hydraulic liquid is generated due to the movement of the above-described piston rod 8 (for example, between the annular oil chamber D and the reservoir chamber A).

Then, the damping force adjustment valve 18 includes a generally cylindrical valve case 19, a connection tubular member 20, a valve member 21, and the like. The valve case 19 is provided in such a manner that the proximal end side thereof is fixedly attached around the opening 2B of the outer tube 2 and the distal end side thereof protrudes radially outward from the outer tube 2. The connection tubular member 20 is provided in such a manner that the proximal end side thereof is fixed to the connection port 12C of the intermediate tube 12, and, along therewith, the distal end side thereof includes an annular flange portion 20A formed thereon and is arranged inside the valve case 19 with a space present therebetween. The valve member 21 is in abutment with the flange portion 20A of this connection tubular member 20.

The valve case 19 includes an annular inner flange portion 19A formed on the proximal end side thereof and a male screw portion 19B formed on the distal end side thereof. The inner flange portion 19A protrudes radially inward. A lock nut 53 is threadedly attached to the male screw portion 19B. The lock nut 53 couples this valve case 19 and a yoke 39 (a one-side tubular portion 39D) of the solenoid 33, which will be described below. An annular oil chamber 19C, which is in constant communication with the reservoir chamber A, is defined between the inner peripheral surface of the valve case 19 and the outer peripheral surface of the valve member 21, and further between the inner peripheral surface of the valve case 19 and the outer peripheral surface of the pilot body 26 and the like.

An oil passage 20B is formed inside the connection tubular member 20. The oil passage 20B has one side in communication with the annular oil chamber D and an opposite side extending to the position of the valve member 21. Further, an annular spacer 22 is provided in a sandwiched state between the flange portion 20A of the connection tubular member 20 and the inner flange portion 19A of the valve case 19. A plurality of radially extending cutouts 22A is provided on this spacer 22. The cutouts 22A serve as radial oil passages for establishing communication between the oil chamber 19C and the reservoir chamber A. In the present embodiment, the damping force adjustment valve 18 is configured in such a manner that the cutouts 22A for forming the oil passages are provided to the spacer 22. However, the damping force adjustment valve 18 may be configured in such a manner that cutouts for forming the oil passages are radially provided to the inner flange portion 19A of the valve case 19. In the case where the damping force adjustment valve 18 is configured in this manner, the spacer 22 can be omitted and thus the number of components can be reduced.

An axially extending central hole 21A is provided on the valve member 21 while being located at the radial center thereof. Further, a plurality of oil passage 21B is provided on the valve member 21 at intervals in the circumferential direction around the central hole 21A, and each of these oil passages 21B has one end side (the left side in FIG. 2) in constant communication with the oil passage 20B of the tubular member 20. Further, an annular recessed portion 21C and an annular valve seat 21D are provided on the end surface of the valve member 21 on the opposite end side thereof (the right side in FIG. 2). The annular recessed portion 21C is formed so as to surround the openings of the oil passages 21B on the opposite side. The annular valve seat 21D is located on the radially outer side of this annular recessed portion 21C. A main valve 23, which will be described below, is seated on and separated from the annular valve seat 21D. Now, each of the oil passages 21B of the valve member 21 serves as a flow passage through which the hydraulic oil flows between the oil passage 20B of the connection tubular member 20 in communication with the annular oil chamber D and the oil chamber 19C of the valve case 19 in communication with the reservoir chamber A at a flow rate according to the opening degree of the main valve 23.

The main valve 23 is formed by a disk valve interposed between the valve member 21 and a large-diameter portion 24A of a pilot pin 24 on the inner peripheral side thereof. The outer peripheral side of the main valve 23 is seated on and separated from the annular valve seat 21D of the valve member 21. An elastic seal member 23A is fixedly attached to the outer peripheral portion of the main valve 23 on the back surface side thereof by a method such as baking. The main valve 23 is opened by receiving a pressure on the oil passage 21B side (the annular chamber D side) of the valve member 21 to be separated from the annular valve seat 21D. As a result, the oil passages 21B (the annular oil chamber D side) of the valve member 21 is brought into communication with the oil chamber 19C (the reservoir chamber A side) via the main valve 23, and the amount (the flow rate) of the hydraulic oil flowing in a direction indicated by an arrow Y at this time is variably adjusted according to the opening degree of the main valve 23.

The pilot pin 24 is formed into a stepped cylindrical shape, and the annular large-diameter portion 24A is provided at an axially intermediate portion thereof. The pilot pin 24 includes an axially extending central hole 24B on the inner peripheral side thereof, and a small-diameter hole (an orifice 24C) is formed at one end portion of the central hole 24B (the end portion on the connection tubular member 20 side). One end side (the left end side in FIG. 2) of the pilot pin 24 is press-fitted in the central hole 21A of the valve member 21, and the main valve 23 is interposed between the large-diameter portion 24A and the valve member 21. The opposite end side (the right end side in FIG. 2) of the pilot pin 24 is fitted in a central hole 26C of the pilot body 26. In this state, axially extending oil passages 25 are formed between the central hole 26C of the pilot body 26 and the opposite end side of the pilot pin 24. These oil passages 25 are in communication with a back-pressure chamber 27 formed between the main valve 23 and the pilot body 26. In other words, the plurality of axially extending oil passages 25 is circumferentially arranged on the side surface of the pilot pin 24 on the opposite end side, and the circumferential positions other than that are press-fitted in the central hole 26C of the pilot body 26.

The pilot body 26 is formed as a generally bottomed tubular member including a cylindrical portion 26A and a bottom portion 26B. The cylindrical portion 26A includes a stepped hole formed inside it. The bottom portion 26B closes this cylindrical portion 26A. The central hole 26C is provided at the bottom portion 26B of the pilot body 26. The opposite end side of the pilot pin 24 is fitted in the central hole 26C. A protrusion tubular portion 26D is integrally provided on the outer peripheral side of the bottom portion 26B of the pilot body 26. The protrusion tubular portion 26D extends toward the valve member 21 side (i.e., the left side in FIG. 2) throughout the entire circumference thereof. The elastic seal member 23A of the main valve 23 is liquid-tightly fitted to the inner peripheral surface of this protrusion tubular portion 26D, and the back-pressure chamber 27 is formed between the main valve 23 and the pilot body 26 thereby. This back-pressure chamber 27 generates a pressure (a pilot pressure) that presses the main valve 23 in a valve-closing direction, i.e., in a direction causing the main valve 23 to be seated onto the annular valve seat 21D of the valve member 21.

The valve seat portion 26E is provided on the bottom portion 26B of the pilot body 26 so as to surround the central hole 26C while being located on the opposite end side thereof (the right end side in FIG. 2). The pilot valve member 32, which will be described below, is seated on and separated from the valve seat portion 26E Further, a return spring 28, a disk valve 29, a holding plate 30, and the like are arranged inside the cylindrical portion 26A of the pilot body 26. The return spring 28 biases the pilot valve member 32 in a direction away from the valve seat portion 26E of the pilot body 26. The disk valve 29 forms a fail-safe valve when the solenoid 33, which will be described below, is in a state that no power is supplied thereto (when the pilot valve member 32 is maximumly separated from the valve seat portion 26E). The holding plate 30 includes an oil passage 30A formed on the central side thereof.

A cap 31 is fitted and fixed at the opening edge of the cylindrical portion 26A of the pilot body 26 with the return spring 28, the disk valve 29, the holding plate 30, and the like arranged inside this cylindrical portion 26A. Cutouts 31A are formed on this cap 31 at, for example, positions of four portions circumferentially spaced apart from each other. These cutouts 31A serve as flow passages that allow oil liquid delivered to the solenoid 33 side via the oil passage 30A of the holding plate 30 to flow into the oil chamber 19C (the reservoir chamber A side) in a direction indicated by an arrow X illustrated in FIG. 2.

The pilot valve member 32 forms the pilot valve together with the pilot body 26. The pilot valve member 32 is formed into a stepped cylindrical shape, and includes a gradually narrowing taper portion at a distal end portion thereof that is seated on and separated from the valve seat portion 26E of the pilot body 26. The actuation pin 49 of the solenoid 33, which will be described below, is fixed in a fitted state inside the pilot valve member 32, and the pilot valve is configured in such a manner that the valve-opening pressure of the pilot valve member 32 is adjusted according to power supply to the solenoid 33. A flange portion 32A, which serves as a spring bearing, is formed on the proximal end side of the pilot valve member 32 throughout the entire circumference thereof. This flange portion 32A functions to restrict the maximum opening degree of the pilot valve member 32 by abutting against the inner peripheral portion of the disk valve 29 when the solenoid 33 is in the state that no power is supplied thereto (i.e., when the pilot valve member 32 is displaced to a fully opened position maximumly spaced apart from the valve seat portion 26E).

Next, the solenoid 33, which forms the damping force adjustment mechanism 17 together with the damping force adjustment valve 18, will be described with reference to FIGS. 2, 3, and 4.

The solenoid 33 is used in a damping force adjustable shock absorber to adjust the valve-opening and closing operations of the damping force adjustment valve 18. More specifically, the solenoid 33 used as the damping force variable actuator of the damping force adjustment mechanism 17 includes a molded coil 34, a housing member 36, a yoke 39, a stator 41, a non-magnetic ring 44, the movable element 48, the actuation pin 49, a cover member 51, and the like.

The molded coil 34 is generally cylindrically formed by winding a coil 34A around a coil bobbin 34B and integrally covering (molding) them with a resin member 34C such as thermosetting resin in this state. A cable extraction portion (not illustrated) protruding axially or radially outward is provided at a circumferential part of the molded coil 34, and an electric wire cable (not illustrated) is connected to this cable extraction portion. The coil 34A is annularly wound around the coil bobbin 34B, and becomes an electromagnet and generates a magnetic force in reaction to power supply (energization) from outside via the cable.

A seal groove 34D is formed throughout the entire circumference on the side surface (the end surface on one axial side) of the resin member 34C of the molded coil 34 that faces the yoke 39 (an annular portion 39B), which will be described below. A seal member (for example, an O-ring 35) is attached in this seal groove 34D. This O-ring 35 liquid-tightly seals between the molded coil 34 and the yoke 39 (the annular portion 39B). Due to this provision, dust containing rainwater or mud water can be prevented from entering a tubular protrusion portion 39C side of the yoke 39 via between the yoke 39 and the molded coil 34.

The coil employed in the present embodiment is not limited to the molded coil 34 including the coil 34A, the coil bobbin 34B, and the resin member 34C, and a coil other different from that may also be employed. For example, the employed coil may be configured in such a manner that a coil is wound around the coil bobbin 34B made from an electrically insulating material, and the outer periphery of this coil is covered with an overmold formed by molding a resin material (not illustrated) over it (on the outer peripheral side) in this state.

The housing member 36 forms a first fixed iron core (a housing) provided so as to be disposed on the inner peripheral side of the molded coil 34 (i.e., the inner periphery of the coil 34A). This housing member 36 is made as a covered cylindrical tubular member from a magnetic material (a magnetic body) such as low-carbon steel and carbon steel for machine structural use (S10C). The housing member 36 includes a housing tubular portion 36A, a stepped cover portion 36B, and a small-diameter tubular portion 36C. The housing tubular portion 36A is a housing portion extending in a direction of a winding axis of the molded coil 34 (the coil 34A) and having an opening on one end side thereof. The cover portion 36B closes the opposite end side of this housing tubular portion 36A. The small-diameter tubular portion 36C is formed by reducing the diameter of the outer periphery of the housing tubular portion 36A on the opening side (the one side) thereof, and is used for joining.

The non-magnetic ring 44, which will be described below, is joined to the small-diameter tubular portion 36C of the housing member 36 via a brazed portion 45. The housing tubular portion 36A of the housing member 36 is formed in such a manner that the inner diameter dimension thereof is slightly larger than the outer diameter dimension of the movable element 48, which will be described below, and the movable element 48 is axially movably housed in the housing tubular portion 36A.

The cover portion 36B of the housing member 36 (the right side in FIGS. 2 and 3) is integrally formed on the housing tubular portion 36A as a covered tubular body that closes the housing tubular portion 36A from the opposite axial side. The cover portion 36B has a stepped shape smaller in outer diameter than the outer diameter of the housing tubular portion 36A, and a fitted tubular portion 51A of the cover member 51, which will be described below, is fittedly provided on the outer peripheral side of the cover portion 36B. Further, a bottomed stepped hole 37 is formed in the housing member 36 while being located inside the cover portion 36B. This stepped hole 37 includes a bush attachment hole portion 37A and a small-diameter hole portion 37B. The small-diameter hole portion 37B is located at a deeper side and formed to have a smaller diameter than this bush attachment hole portion 37A. A first bush 38 is provided in the bush attachment hole portion 37A. The first bush 38 is used to slidably support the actuation pin 49, which will be described below.

Further, the end surface of the cover portion 36B of the housing member 36 on the opposite side thereof is disposed so as to face a cover plate 51B of the cover member 51, which will be described below, with an axial space present therebetween. This axial space has a function of preventing an axial force from being directly applied from the cover plate 51B side of the cover member 51 to the housing member 36 via the cover portion 36B. The cover portion 36B of the housing member 36 does not necessarily have to be formed integrally with the housing tubular portion 36A using the same material (the magnetic body). The cover portion 36B in this case can also be made from, for example, a rigid metal material, a ceramic material, or a fiber-reinforced resin material, instead of the magnetic material.

The yoke 39 is a magnetic member that forms a magnetic circuit (a magnetic path) throughout the inner peripheral side and the outer peripheral side of the molded coil 34 (the coil 34A) together with the housing member 36. This yoke 39 includes the annular portion 39B and a tubular protrusion portion 39C. The annular portion 39B is formed using a magnetic material (a magnetic body) similarly to the housing member 36, and radially extends on one axial side of the molded coil 34 (the coil 34A) (one side in the direction of the winding axis) and includes a stepped fixation hole 39A on the inner peripheral side thereof. The tubular protrusion portion 39C protrudes tubularly along the axial direction of the fixation hole 39A from the inner peripheral side of this annular portion 39B toward the opposite axial side (toward a connection member 44, which will be described below). The tubular protrusion portion 39C is used for joining.

Further, the yoke 39 is formed as an integrated member including a cylindrical one-side tubular portion 39D, an opposite-side tubular portion 39E, and a crimped portion 39F. The one-side tubular portion 39D extends from the outer peripheral side of the above-described annular portion 39B toward the one axial side (the damping force adjustment valve 18 side). The opposite-side tubular portion 39E extends from the outer peripheral side of the annular portion 39B toward the opposite axial side (the cover member 51 side), and is formed so as to surround the molded coil 34 from the radially outer side. The crimped portion 39F holds a flange portion 51C of the cover member 51 provided at the distal end side of this opposite-side tubular portion 39E in a retained state. A cutout (not illustrated) is provided at the opposite-side tubular portion 39E of the yoke 39. This cutout is used to expose the above-described cable extraction portion of the molded coil 34 to outside the opposite-side tubular portion 39E.

An engagement recessed portion 39G is provided between the one-side tubular portion 39D and the opposite-side tubular portion 39E of the yoke 39 (throughout the entire circumference or at a plurality of portions at circumferential intervals). The engagement recessed portion 39G has a semi-circular shape in cross section so as to be opened on the outer peripheral surface of the yoke 39. The lock nut 53, which will be described below, is engaged with this engagement recessed portion 39G via a retaining ring 54 (refer to FIG. 2). The lock nut 53 is threadedly attached to the valve case 19 of the damping force adjustment valve 18. Further, a seal groove 39H is provided on the outer peripheral surface of the one-side tubular portion 39D throughout the entire circumference. An O-ring 40 as a seal member is attached in this seal groove 39H, and this O-ring 40 liquid-tightly seals between the yoke 39 (the one-side tubular portion 39D) and the valve case 19 of the damping force adjustment valve 18.

The stator 41 is a second fixed iron core (anchor) fixed in the fixation hole 39A of the yoke 39 using a method such as press-fitting. The stator 41 is made from a magnetic material (a magnetic body) such as low-carbon steel and carbon steel for machine structural use (S10C) similarly to the housing member 36 (the first fixed iron core) and the yoke 39, and is formed into a shape filling the fixation hole 39A of the yoke 39 from inside. The stator 41 is formed as a short cylindrical annular member having an axially extending through-hole 41A on the central side thereof. The surface of the stator 41 on the one axial side (the surface that axially faces the cap 31 of the damping force adjustment valve 18 illustrated in FIG. 2) is formed into a flat surface similarly to the surface of the annular portion 39B of the yoke 39 on the one side.

A circular recessed dented portion 41B is provided in a recessed manner on the opposite axial side of the stator 41 (the surface on the opposite side that axially faces the movable element 48, which will be described below) coaxially with the housing tubular portion 36A. This recessed dented portion 41B is formed as a circular groove slightly larger in diameter than the movable element 48 so as to allow the movable element 48, which will be described below, to be inserted inside it advanceably and retractably according to a magnetic force. Further, a conical protrusion portion 41C is provided on the opposite side of the stator 41 so as to surround the recessed dented portion 41B around it (the outer periphery). This conical protrusion portion 41C has an outer peripheral surface formed as a conical surface so as to establish a linear (linearity) magnetic characteristic between the stator 41 and the movable element 48.

Figure 3:
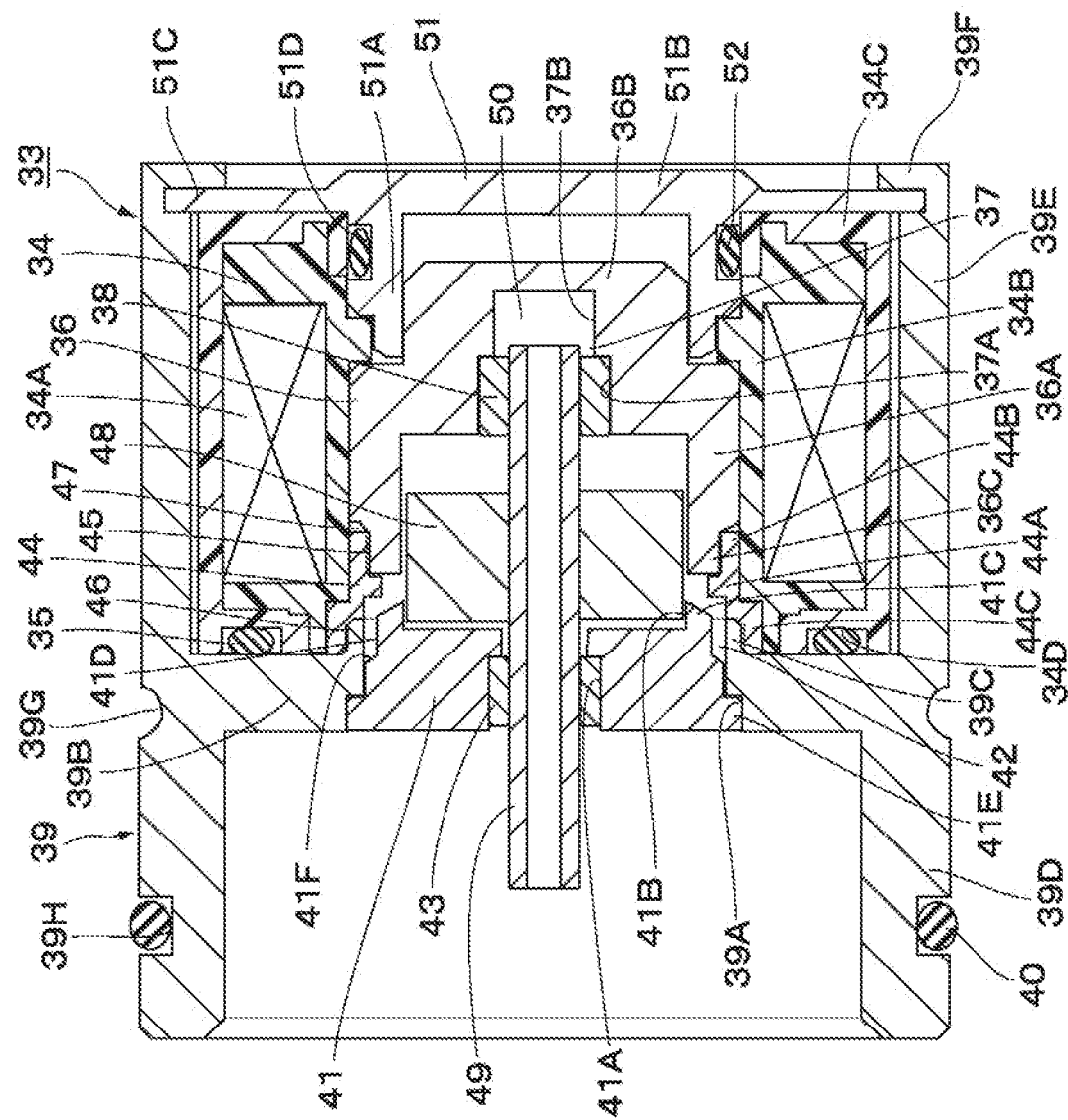
FIG. 3 is a cross-sectional view illustrating the solenoid in an enlarged manner with the damping force adjustment valve in FIG. 2 removed therefrom.
Figure 4:
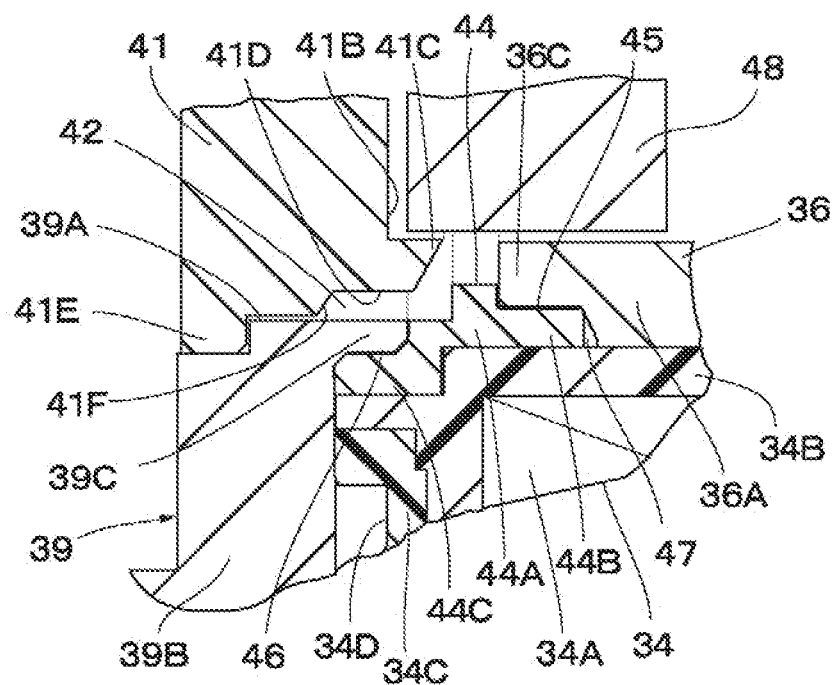
FIG. 4 is an enlarged view of main portions, which illustrates main portions of the solenoid in FIG. 3 in an enlarged manner.

More specifically, the conical protrusion portion 41C protrudes tubularly from the outer peripheral side of the stator 41 toward the opposite axial side, and the outer peripheral surface thereof is shaped like a conical surface inclined in a tapering manner so as to have an outer diameter dimension gradually reducing from the one axial side to the opposite axial side (from the radially outer side to the radially inner side of the recessed dented portion 41B illustrated in FIGS. 3 and 4). In other words, the conical protrusion portion 41C of the stator 41 is provided at a position that faces the opening of the housing member 36 (the housing tubular portion 36A), and is formed as a reduced diameter portion having an outer diameter reducing as it is approaching the opening of the housing tubular portion 36A.

Further, aside surface portion 41D is formed on the outer peripheral side of the stator 41. The side surface portion 41D extends in a direction away from the opening of the above-described housing tubular portion 36A along the outer periphery of the conical protrusion portion 41C (the reduced diameter portion). An annular flange portion 41E protruding radially outward is formed at a portion of this side surface portion 41D that is located on the one axial side of the stator 41, and a stepped portion 41F is formed at an axially intermediate portion of the side surface portion 41D while being located between the conical protrusion portion 41C (the reduced diameter portion) and the flange portion 41E.

In other words, the annular flange portion 41E is disposed at a position largely spaced apart from the opening end of the housing tubular portion 36A to the one axial side (i.e., the end of the stator 41 opposite from the housing portion), and is fixed in the fixation hole 39A of the yoke 39 using a method such as press-fitting. In this manner, the annular flange portion 41E serves as a fixed portion of the stator 41 (the side surface portion 41D) to the fixation hole 39A of the yoke 39 and also serves as a portion where the flange portion 41E and the fixation hole 39A radially face each other.

Then, anon-contact portion 42 is formed between the side surface portion 41D of the stator 41 and the fixation hole 39A of the yoke 39 while being located on the opposite axial side from the flange portion 41E (the housing member 36 side). The side surface portion 41D of the stator 41 and the fixation hole 39A of the yoke 39 are out of contact with each other at the non-contact portion 42. This non-contact portion 42 is formed by an annular space defined between the fixation hole 39A of the yoke 39 and the side surface portion 41D (the stepped portion 41F) of the stator 41 throughout the entire circumference. The above-described stepped portion 41F is formed on the surface where the side surface portion 41D of the stator 41 and the yoke 39 (the fixation hole 39A) radially face each other. Further, in the case where the stepped portion 41F is provided on the side surface portion 41D of the stator 41, this stepped portion 41F is formed on the above-described reduced diameter portion (the conical protrusion portion 41C) side of the side surface portion 41D.

As illustrated in FIG. 3, a second bush 43 is fittedly provided in the above-described stepped through-hole 41A formed on the central (inner peripheral) side of the stator 41. The second bush 43 is used to slidably support the actuation pin 49, which will be described below. On the other hand, as illustrated in FIG. 2, the pilot body 26 of the damping force adjustment valve 18, the return spring 28, the disk valve 29, the holding plate 30, the cap 31, and the like are provided by being inserted on the inner peripheral side of the one-side tubular portion 39D of the yoke 39. Further, the valve case 19 of the damping force adjustment valve 18 is fitted (externally fitted) on the outer peripheral side of the one-side tubular portion 39D.

The non-magnetic ring 44 is a non-magnetic connection member (a cylinder) provided on the inner peripheral side of the molded coil 34 (the coil 34A) while being located between the small-diameter tubular portion 36C of the housing member 36 and the tubular protrusion portion 39C of the yoke 39. The non-magnetic ring 44 is made as a stepped cylindrical member from a non-magnetic material such as austenitic stainless steel. The non-magnetic ring 44 includes an axially intermediate stepped tubular portion 44A and first and second connection tubular portions 44B and 44C. The first and second connection tubular portions 44B and 44C protrude axially from both the ends of this stepped tubular portion 44A, respectively.

Now, the non-magnetic ring 44 is formed in such a manner that the second connection tubular portion 44C has a larger radial dimension than the first connection tubular portion 44B by, for example, an amount corresponding to the thickness of the connection tubular portion 44B. Then, the first and second connection tubular portions 44B and 44C are molded so as to each have a desired thickness (a radial thickness) using the above-described non-magnetic material so as to be able to achieve desired coaxiality together with the stepped tubular portion 44A. The first connection tubular portion 44B of the non-magnetic ring 44 is fitted to the small-diameter tubular portion 36C of the housing member 36 from outside, and they are joined via the brazed portion 45. Further, the second connection tubular portion 44C is fitted to the outer peripheral side of the tubular protrusion portion 39C of the yoke 39, and they are joined via the brazed portion 46.

At the brazed portions 45 and 46, the non-magnetic ring 44 is joined to the small-diameter tubular portion 36C of the housing member 36 and the tubular protrusion portion 39C of the yoke 39, respectively, by performing brazing processing at, for example, 1000° C. or higher using a brazing material made of pure copper brazing filler metal. Quenching processing is performed after the brazing processing. In this state, the non-magnetic ring 44 is formed in such a manner that the inner diameter thereof (i.e., the inner diameter of the stepped tubular portion 44A) exceeds the inner diameter of the housing member 36 (the housing tubular portion 36A) and exceeds the recessed dented portion 41B of the stator 41 (i.e., the radial dimension of the recessed dented portion 41B) as illustrated in FIG. 3.

An annular space 47 is formed on the small-diameter tubular portion 36C of the housing member 36 on the outer peripheral side thereof between the small-diameter tubular portion 36C and the first connection tubular portion 44B of the non-magnetic ring 44. This space 47 is an introduction path for pouring the above-described brazing material (the pure copper brazing filler metal) in a heated and melted state into between the housing member 36 (the small-diameter tubular portion 36C) and the non-magnetic ring 44 (the first connection tubular portion 44B). Then, this space 47 also functions as a gap for absorbing a thermal expansion difference between the small-diameter tubular portion 36C of the housing member 36 (the tubular protrusion portion 39C of the yoke 39) and the non-magnetic ring 44.

An introduction path for pouring the brazing material (the pure copper brazing filler metal) of the above-described brazed portion 46 in a heated and melted state is also formed between the tubular protrusion portion 39C of the yoke 39 and the non-magnetic ring 44 (the second connection tubular portion 44C) similarly to the above-described space 47. However, on the non-magnetic ring 44, when the above-described brazing material (the pure copper brazing filler metal) is poured while being kept in the heated and melted state to join the second connection tubular portion 44C to the outer peripheral surface of the tubular protrusion portion 39C of the yoke 39, an external axial force is applied to therebetween so as to eliminate the above-described space as much as possible. However, a thermal expansion difference is generated between the small-diameter tubular portion 36C of the housing member 36 (the tubular protrusion portion 39C of the yoke 39) and the non-magnetic ring 44 due to a difference in the material (the contained substance). Therefore, the axial space 47 is formed so as to extend throughout the entire circumference between the small-diameter tubular portion 36C of the housing member 36 and the first connection tubular portion 44B of the non-magnetic ring 44.

In this case, the non-magnetic ring 44 is a non-magnetic connection member made from austenitic stainless steel, and is configured in such a manner that the brazing is performed using the pure copper brazing filler metal (the brazing material) when this non-magnetic ring 44 is joined between the housing member 36 and the yoke 39 via the brazed portions 45 and 46. Generally, when an austenitic stainless steel component made from a non-magnetic material is distorted by being subjected to deep-drawing or cutting processing, deformation-induced martensite is generated in this material and undesirably causes the crystal structure of a part thereof to be transformed into a body-centered cubic structure instead of a face-centered cubic structure ideal as the non-magnetic material, thereby undesirably causing the non-magnetic material to have an easily magnetizable characteristic. However, the deformation-induced martensite in austenitic stainless steel is removed by applying a thermal treatment at 1000° C. or higher, and the non-magnetic material is returned to the ideal face-centered cubic structure again. This processing is called a solution heat treatment.

In light thereof, the present embodiment selects the pure copper brazing filler metal as the brazing material having the brazing temperature of 1000° C. or higher and performs processing workable as both the brazing and the solution heat treatment at the brazed portions 45 and 46, thereby making it possible to return the crystal structure to the face-centered cubic structure ideal as the non-magnetic material in the non-magnetic ring 44 joined between the small-diameter tubular portion 36C of the housing member 36 and the tubular protrusion portion 39C of the yoke 39. In addition, the non-magnetic ring 44 is press-fitted between the small-diameter tubular portion 36C of the housing member 36 and the tubular protrusion portion 39C of the yoke 39 and is brought into abutment therewith, thereby preventing or reducing a thermal deformation thereof due to the high temperature at the time of the brazing, eliminating the necessity of performing the cutting processing intended to correct the shape after the brazing, and thus succeeding in maintaining the desired dimension and shape. The brazing material may be a brazing material different from the pure copper brazing filler metal as long as the brazing temperature thereof is 1000° C. or higher. The brazing material may be, for example, yellow brass brazing filler metal, nickel brazing filler metal, gold brazing filler metal, or palladium brazing filler metal.

In this manner, even when the non-magnetic ring 44 is joined to the small-diameter tubular portion 36C of the housing member 36 and the tubular protrusion portion 39C of the yoke 39 via the brazed portions 45 and 46 and a thermal expansion difference derived from the difference in the material (the contained substance) is generated between them due to the quenching processing after the brazing, the occurrence of a distortion based thereon can be suppressed with the aid of the above-described space 47. Then, the connection member made from a non-magnetic body (for example, the non-magnetic ring 44) may be configured to be heated and joined between the small-diameter tubular portion 36C of the housing member 36 and the tubular protrusion portion 39C of the yoke 39 using a method different from the brazing (for example, a joining method such as laser welding).

The movable element 48 is an armature made from a magnetic body provided movably in the direction of the winding axis of the coil 34A between the housing tubular portion 36A of the housing member 36 and the recessed dented portion 41B of the stator 41. The movable element 48 is arranged on the inner peripheral sides of the housing tubular portion 36A of the housing member 36, the recessed dented portion 41B of the stator 41, the tubular protrusion portion 39C of the yoke 39, and the non-magnetic ring 44, and is axially movable between the housing tubular portion 36A of the housing member 36 and the recessed dented portion 41B of the stator 41. In other words, the movable element 48 is arranged on the inner peripheral sides of the housing tubular portion 36A of the housing member 36 and the recessed dented portion 41B of the stator 41, and is axially movable via the first and second bushes 38 and 43 and the actuation pin 49 under the magnetic force generated on the coil 34A.

The movable element 48 is provided fixedly (integrally) to the actuation pin 49 extending through the central side thereof, and is movable together with the actuation pin 49. The actuation pin 49 is axially slidably supported on the cover portion 36B of the housing member 36 and the stator 41 via the first and second bushes 38 and 43. Now, the movable element 48 is generally cylindrically formed using a ferrous magnetic body similarly to, for example, the housing member 36, the yoke 39, and the stator 41. Then, a thrust force is generated on the movable element 48 in a direction for attracting the movable element 48 toward inside the recessed dented portion 41B of the stator 41 due to the magnetic force generated on the coil 34A.

The actuation pin 49 is a shaft portion that transmits the thrust force of the movable element 48 to the pilot valve member 32 of the damping force adjustment valve 18 (a control valve), and is formed by a hollow rod. The movable element 48 is integrally fixed at an axial intermediate portion of the actuation pin 49 using a method such as press-fitting, and the movable element 48 and the actuation pin 49 are sub-assembled by that. The actuation pin 49 is axially slidably supported on the cover portion 36B of the housing member 36 and the yoke 39 (the stator 41) via the first and second bushes 38 and 43.

One end side (the end portion on the left side in FIG. 2) of the actuation pin 49 protrudes from the stator 41 (the yoke 39), and, along therewith, the pilot valve member 32 of the damping force adjustment valve 18 is fixed to the protrusion end thereof. Therefore, the pilot valve member 32 is axially moved integrally together with the movable element 48 and the actuation pin 49. In other words, the valve-opening pressure of the pilot valve member 32 is set to a pressure value corresponding to the thrust force of the movable element 48 based on power supply to the coil 34A. The movable element 48 is configured to open and close the pilot valve of the hydraulic shock absorber 1 (i.e., open and close the pilot valve member 32 from and to the pilot body 26) by being axially moved under the magnetic force from the coil 34A.

A back-pressure chamber 50 is an oil chamber formed between the cover portion 36B of the housing member 36 (the small-diameter hole portion 37B of the stepped hole 37) and the opposite end of the actuation pin 49 (the end portion on the right side in FIG. 2). This back-pressure chamber 50 is in communication with the central hole 24B side of the pilot pin 24 via the hollow rod (the actuation pin 49). Therefore, the back-pressure chamber 50 is subjected to a pressure equal to the pilot valve member 32, which is seated on and separated from the valve seat portion 26E of the pilot body 26. However, regarding the pressure-receiving area to receive this pressure, the area over which the opposite end surface of the actuation pin 49 receives the pressure in the back-pressure chamber 50 is smaller than the area over which the pilot valve member 32 (the one end side of the actuation pin 49) receives the pressure between it and the valve seat portion 26E. This allows the thrust force that should be transmitted from the movable element 48 to the pilot valve member 32 of the damping force adjustment valve 18 via the actuation pin 49 to be reduced by an amount corresponding the difference in the pressure-receiving area therebetween.

In this manner, the formation of the back-pressure chamber 50 between the actuation pin 49 and the cover portion 36B on the opposite end side of the actuation pin 49 can contribute to reducing the thrust force that should be transmitted from the movable element 48 to the pilot valve member 32 of the damping force adjustment valve 18 via the actuation pin 49 (for example, the magnetic force that should be generated by the coil 34A of the molded coil 34), thereby achieving a size reduction and a weight reduction of the solenoid 33 as a whole.

The cover member 51 is a magnetic-body cover that covers the molded coil 34 from outside together with the opposite-side tubular portion 39E of the yoke 39. This cover member 51 is made from a magnetic material (a magnetic body) as the cover member that covers the molded coil 34 from the opposite axial side, and forms a magnetic circuit (a magnetic path) outside the molded coil 34 (the coil 34A) together with the opposite-side tubular portion 39E of the yoke 39. Then, the cover member 51 is formed into a covered tubular shape as a whole, and includes the cylindrical fitted tubular portion 51A and the cover plate 51B shaped like a circular plate, which closes the opposite end side (the end portion on the right side in FIGS. 2 and 3) of this fitted tubular portion 51A.

Now, the fitted tubular portion 51A of the cover member 51 is configured to be fittedly inserted on the outer periphery of the cover portion 36B of the housing member 36 and house the cover portion 36B of the housing member 36 inside it in this state. On the other hand, the annular flange portion 51C extending to the radially outer side of the fitted tubular portion 51A is formed on the outer peripheral side of the cover plate 51B of the cover member 51, and the outer peripheral edge of this flange portion 51C is fixed to the crimped portion 39F provided on the opposite-side tubular portion 39E of the yoke 39. Due to this configuration, the opposite-side tubular portion 39E of the yoke 39 and the cover plate 51B of the cover member 51 are preliminarily assembled (sub-assembled) with the molded coil 34 built inside them as illustrated in FIG. 3.

In this manner, the cover portion 36B of the housing member 36 is fittedly attached in the fitted tubular portion 51A of the cover member 51 in the state that the molded coil 34 is built inside the opposite-side tubular portion 39E of the yoke 39 and the cover plate 51B of the cover member 51. Due to this configuration, a magnetic flux can be transferred between the fitted tubular portion 51A and the cover plate 51B of the cover member 51 and the yoke 39. Further, a seal groove 51D is formed on the fitted tubular portion 51A of the cover member 51 throughout the entire circumference on the outer peripheral side to which the resin member 34C of the molded coil 34 is fitted. A seal member (for example, an O-ring 52) is attached in this seal groove 51D. This O-ring 52 liquid-tightly seals between the molded coil 34 and the cover member 51 (the fitted tubular portion 51A). As a result, dust containing rainwater or mud water can be prevented from entering between the housing member 36 and the molded coil 34 via between the cover member 51 and the molded coil 34, and thus entering, for example, between the housing member 36 and the cover member 51.

The yoke 39 and the cover member 51 are fastened to the valve case 19 of the damping force adjustment valve 18 using the lock nut 53 and the retaining ring 54 as fastening members as illustrated in FIG. 2 with the molded coil 34 built inside them as illustrated in FIG. 3. In this case, the retaining ring 54 is attached to the engagement recessed portion 39G of the yoke 39 prior to the lock nut 53. This retaining ring 54 partially protrudes radially outward from the engagement recessed portion 39G of the yoke 39 and works to transmit the fastening force derived from the lock nut 53 to the one-side tubular portion 39D of the yoke 39.

The lock nut 53 is formed as a stepped tubular member, and includes a female screw portion 53A and an engagement tubular portion 53B. The female screw portion 53A is located on one axial side of the lock nut 53, and is threadedly engaged with the male screw portion 19B of the valve case 19 on the inner peripheral side thereof. The engagement tubular portion 53B is bent radially inward in such a manner that the inner diameter dimension thereof falls below the outer diameter dimension of the retaining ring 54, and is engaged with the retaining ring 54 from outside. The lock nut 53 is a fastening member that integrally couples the damping force adjustment valve 18 and the solenoid 33 by threadedly engaging the female screw portion 53A and the male screw portion 19B of the valve case 19 with the inner surface of the engagement tubular portion 53B in abutment with the retaining ring 54 attached to the engagement recessed portion 39G of the yoke 39.

The solenoid 33, the damping force adjustment mechanism 17, and the hydraulic shock absorber 1 according to the first embodiment is configured in the above-described manner, and the operations thereof will be described next.

First, when the hydraulic shock absorber 1 is mounted on the vehicle such as an automobile, for example, the protrusion end (upper end) side of the piston rod 8 is attached to the vehicle body side of the vehicle, and the mounting eye 3A side provided on the bottom cap 3 is attached to the wheel side. Then, the solenoid 33 of the damping force adjustment mechanism 17 is connected to a control apparatus (a controller) provided on the vehicle body side of the vehicle via, for example, an electric wiring (a cable) (both are not illustrated).

When the vehicle runs, upon occurrence of a vertical vibration due to unevenness of a road surface or the like, the piston rod 8 is displaced so as to extend or compress from and into the outer tube 2, and therefore the damping force can be generated by the damping force adjustment mechanism 17 and the like and the vibration of the vehicle can be damped. At this time, the above-described controller can variably control the damping force to be generated by the hydraulic shock absorber 1 by changing the current value of a control signal to be supplied to the coil 34A of the solenoid 33 to adjust the valve-opening pressure of the pilot valve member 32.

At this time, the magnetic force (the magnetic flux) generated from the coil 34A of the solenoid 33 establishes a magnetic circuit so as to pass from the housing member 36 through the movable element 48 side so as to avoid the non-magnetic ring 44 (the non-magnetic connection member), pass from the movable element 48 through the conical protrusion portion 41C, the stepped portion 41F, and the flange portion 41E of the stator 41 to reach the fixation hole 39A, the annular portion 39B, and the opposite-side tubular portion 39E of the yoke 39, and further pass from the crimped portion 39F side of the yoke 39 through the cover plate 51B and the fitted tubular portion 51A of the cover member 51 to return to the housing tubular portion 36A of the housing member 36.

In the magnetic circuit in this case, all the transfers of the magnetic flux can be conducted at the abutment portions (i.e., portions where magnetic bodies are in planar contact with each other) except for the transfers of the magnetic flux between the movable element 48 and the housing member 36 that face each other via an extremely small space, and between the movable element 48 and the conical protrusion portion 41C (the reduced diameter portion) of the stator 41 that face each other in a similar manner. Therefore, the magnetic circuit of the solenoid 33 can ensure high magnetic efficiency.

Then, the non-magnetic ring 44, which is the non-magnetic connection member, is provided between the housing member 36 and the yoke 39 forming the main portions of the solenoid 33 (between the small-diameter tubular portion 36C of the housing member 36 and the tubular protrusion portion 39C of the yoke 39) while being located on the inner peripheral side of the molded coil 34 (the coil 34A). This non-magnetic ring 44 is joined between the small-diameter tubular portion 36C of the housing member 36 and the tubular protrusion portion 39C of the yoke 39 via the brazed portions 45 and 46 to increase the magnetic flux density of the magnetic circuit with respect to the movable element 48. However, the non-magnetic connection member (the non-magnetic ring 44) involves such a problem that applying mechanical processing (for example, processing of cutting the inner peripheral surface) thereto after the joining would lead to a change in the magnetic characteristic due to a processing distortion at this time, thereby facilitating the magnetization of the non-magnetic connection member.

Further, for the damping force adjustment mechanism 17 provided so as to protrude radially outward from the lower portion side of the outer tube 2 as illustrated in FIG. 1, there is such a demand that the axial length (the protrusion dimension) thereof is desired to be reduced. Then, the reduction in the axial length requires a reduction in the axial dimension of the movable element 48, and the securement of the thrust force characteristic as the solenoid under this condition requires an increase in the outer diameter (the radial dimension) of the movable element 48.

In light thereof, in the present embodiment, the non-magnetic ring 44, which is made from the non-magnetic material such as austenitic stainless steel, is formed as the stepped cylindrical integrated member including the axially intermediate stepped tubular portion 44A and the first and second connection tubular portions 44B and 44C protruding axially from both the ends of this stepped tubular portion 44A, respectively. Then, the non-magnetic ring 44 (the stepped tubular portion 44A) is formed in such a manner that the inner diameter dimension thereof exceeds the inner diameters of the small-diameter tubular portion 36C of the housing member 36 and the tubular protrusion portion 39C of the yoke 39.

In other words, the non-magnetic ring 44 is formed in such a manner that the inner diameter of the non-magnetic ring 44 (i.e., the inner diameter dimension of the stepped tubular portion 44A) exceeds the inner diameter of the housing member 36 (the housing tubular portion 36A) and the inner diameter of the yoke 39 (i.e., the inner diameter dimension of the fixation hole 39A and the tubular protrusion portion 39C) as illustrated in FIGS. 3 and 4 with the non-magnetic ring 44 joined between the housing member 36 and the yoke 39 via the brazed portions 45 and 46.

Further, the solenoid 33 is configured in such a manner that the radial dimension of the recessed dented portion 41B of the stator 41 and the inner diameter dimension of the conical protrusion portion 41C (the reduced diameter portion), and further the inner diameter dimension of the non-magnetic ring 44 increase as the outer diameter of the movable element 48 increases. In addition, the stator 41 is provided in the fixation hole 39A of the yoke 39 axially opposite of the movable element 48 from the housing tubular portion 36A of the housing member 36 and coaxially therewith, and the reduced diameter portion (the conical protrusion portion 41C), which has the outer diameter reducing as it is approaching the opening of the housing tubular portion 36A, and the side surface portion 41D, which extends from the outer periphery of the above-described reduced diameter portion in the direction away from the opening of the above-described housing tubular portion 36A, are integrally formed on the stator 41 from the magnetic body.

Then, the annular flange portion 41E, which protrudes radially outward, is formed at the portion of this side surface portion 41D on the one axial side of the stator 41, and the stepped portion 41F is formed at the axially intermediate portion of the side surface portion 41D while being located between the conical protrusion portion 41C (the reduced diameter portion) and the flange portion 41E. In this state, the flange portion 41E of the stator 41 is disposed at the position largely spaced apart from the opening end of the housing tubular portion 36A to the one axial side (i.e., the end of the stator 41 opposite from the housing portion), and is fixed in the fixation hole 39A of the yoke 39 using the method such as press-fitting.

In other words, the flange portion 41E of the stator 41 serves as the fixed portion of the stator 41 (the side surface portion 41D) to the fixation hole 39A of the yoke 39, and also serves as the portion where the flange portion 41E and the fixation hole 39A radially face each other. Further, the yoke 39 includes the fixation hole 39A with a part of the side surface portion 41D of the stator 41 (the flange portion 41E) fixed on the inner peripheral surface thereof, and the non-contact portion 42, where the fixation hole 39A and the side surface portion 41D of the stator 41 are out of contact with each other, is formed on the housing member 36 side of this fixation hole 39A.

Due to this configuration, the movable element 48 can be axially movably arranged between the housing tubular portion 36A of the housing member 36 and the recessed dented portion 41B of the stator 41 while being located on the inner peripheral sides of the small-diameter tubular portion 36C of the housing member 36, the tubular protrusion portion 39C of the yoke 39, and the non-magnetic ring 44 (the non-magnetic connection member). In this case, the movable element 48 can be arranged inside the non-magnetic ring 44 with a space present therebetween, and this eliminates the necessity of applying mechanical processing (for example, the processing of cutting the inner peripheral surface) to the non-magnetic ring 44 after the non-magnetic ring 44 is joined to the small-diameter tubular portion 36C of the housing member 36 and the tubular protrusion portion 39C of the yoke 39, thereby also preventing a change in the magnetic characteristic of the non-magnetic ring 44 due to an influence of heat, a processing distortion, and/or the like.

Further, when the flange portion 41E of the stator 41 is fixed by being press-fitted in the fixation hole 39A of the yoke 39 after the non-magnetic ring 44 is joined between the housing member 36 and the yoke 39 via the brazed portions 45 and 46, the non-contact portion 42 is formed between the fixation hole 39A of the yoke 39 and the side surface portion 41D of the stator 41. Therefore, even if apart of the brazing material (the pure copper brazing filler metal) of the above-described brazed portions 45 and 46 is present between the tubular protrusion portion 39C and the connection tubular portion 44C of the non-magnetic ring 44, this brazing material does not adversely affect the work of press-fitting (fixing) the stator 41, and the conical protrusion portion 41C (the reduced diameter portion) of the stator 41 can be prevented from being deformed, for example, radially inward under an external force when being press-fitted.

As a result, the present configuration can facilitate smooth execution of the work of press-fitting the stator 41, which is performed after the non-magnetic ring 44 is joined between the housing member 36 and the yoke 39 via the brazed portions 45 and 46. In other words, the present configuration can facilitate smooth execution of the work of fixing the flange portion 41E of the stator 41 by press-fitting it into the fixation hole 39A of the yoke 39.

In this manner, according to the present embodiment, the characteristic of the non-magnetic ring 44 (the non-magnetic connection member) can be prevented from being changed due to an influence of heat, a processing distortion, and/or the like, and the solenoid 33 can maintain a high magnetic flux density of the magnetic circuit with respect to the movable element 48 between the small-diameter tubular portion 36C of the housing member 36 and the conical protrusion portion 41C of the stator 41 (the tubular protrusion portion 39C of the yoke 39). Then, since the magnetic circuit of the solenoid 33 allows all the transfers of the magnetic flux to be conducted with the magnetic bodies in planar contact with each other except for the transfers of the magnetic flux between the movable element 48 and the housing member 36 that face each other via the extremely small space, and between the movable element 48 and the conical protrusion portion 41C of the stator 41 that face each other in a similar manner, the magnetic circuit of the solenoid 33 can ensure high magnetic efficiency.

In addition, the first connection tubular portion 44B of the non-magnetic ring 44 is fitted to the small-diameter tubular portion 36C of the housing member 36 from outside, and they are joined via the brazed portion 45. Further, the second connection tubular portion 44C is fitted to the outer peripheral side of the tubular protrusion portion 39C of the yoke 39, and they are joined via the brazed portion 46. Then, at the brazed portions 45 and 46, the non-magnetic ring 44 is joined to the small-diameter tubular portion 36C of the housing member 36 and the tubular protrusion portion 39C of the yoke 39, respectively, by performing the brazing processing at, for example, 1000° C. or higher using the brazing material made of the pure copper brazing filler metal, and the quenching processing is performed after the brazing processing.

In this manner, according to the present embodiment, the small-diameter tubular portion 36C of the housing member 36, the tubular protrusion portion 39C of the yoke 39, and the non-magnetic ring 44 are configured in the above-described manner, and the brazing processing is performed at the brazed portions 45 and 46 at, for example, 1000° C. or higher using the pure copper brazing filler metal (the brazing material), by which the three members, the small-diameter tubular portion 36C of the housing member 36, the tubular protrusion portion 39C of the yoke 39, and the non-magnetic ring 44 can be joined to each other as a shape satisfying the coaxiality and can also ensure the pressure-resistant strength against the internal hydraulic oil.

Further, the annular space throughout the entire circumference is formed as the non-contact portion 42 between the fixation hole 39A of the yoke 39 and the side surface portion 41D of the stator 41. This facilitates smooth execution of the work of press-fitting the stator 41 (i.e., the work of fixing the stator 41 by press-fitting the flange portion 41E of the stator 41 into the fixation hole 39A of the yoke 39), which is performed after the non-magnetic ring 44 is joined between the housing member 36 and the yoke 39 via the brazed portions 45 and 46.

Therefore, in the solenoid 33 used for a semi-active damper (the damping force adjustable shock absorber) to adjust the valve-opening and closing operations of the damping force adjustment valve 18, even when the axial length of the movable element 48 is reduced to reduce the axial length of the damping force adjustment mechanism 17 (the solenoid 33), the present embodiment does not lead to a reduction in the region housing the molded coil 34 (the coil 34A) due to the increase in the outer diameter of the movable element 48, thereby preventing an influence on the number of windings of the coil and the resistance value and thus being able to ensure the thrust force characteristic as the solenoid 33.

Then, at the time of the work of assembling the solenoid 33, the present embodiment can facilitate smooth execution of the work of press-fitting (fixing) the stator 41 to the fixation hole 39A of the yoke 39 after joining the non-magnetic ring 44 between the housing member 36 and the yoke 39 by the brazing, and prevent the conical protrusion portion 41C (the reduced diameter portion) of the stator 41 from being deformed, for example, radially inward under an external force when being press-fitted.

Therefore, according to the present embodiment, the solenoid 33 can maintain a high magnetic flux density passing through the movable element 48 between the housing member 36 and the stator 41 (the yoke 39) and maintain an excellent thrust force characteristic as the solenoid 33, and can also improve the workability at the time of the assembling. In the present embodiment, the solenoid 33 is configured to include the connection member 44 made from the non-magnetic body joined by being heated between the housing member 36 and the yoke 39. However, even when the space between the housing member 36 and the yoke 39 is sealingly closed using press-fitting, a similar problem also occurs and therefore the present invention can also be applied thereto.

Figure 5:
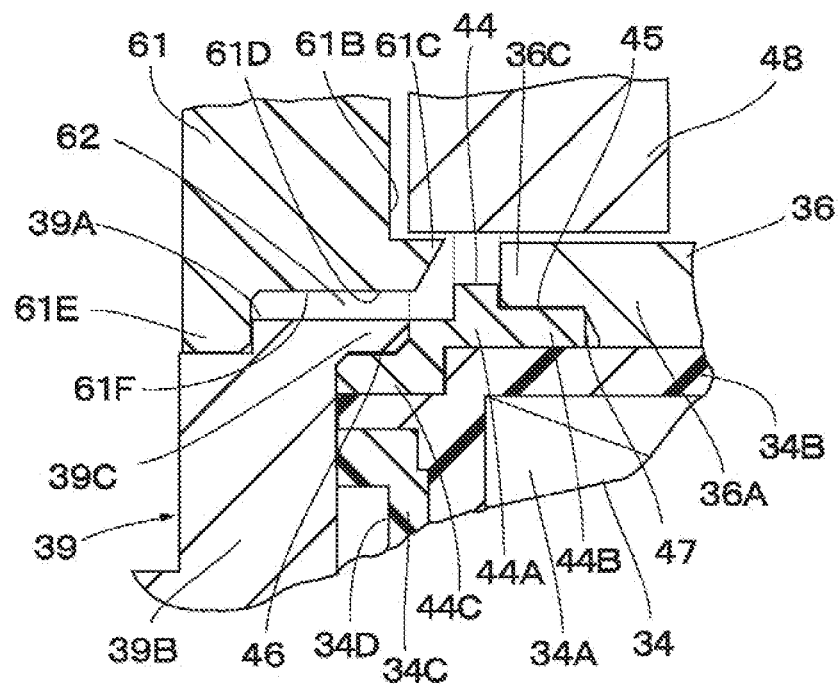
FIG. 5 is an enlarged view of main portions of a solenoid according to a second embodiment.

Next, FIG. 5 illustrates a second embodiment, and the present embodiment will be described identifying similar components to the above-described first embodiment by the same reference numerals and omitting the descriptions thereof. However, the second embodiment is characterized by being configured in such a manner that a stator 61 is fixed by being press-fitted in the fixation hole 39A of the yoke 39 instead of the stator 41 according to the first embodiment.

The stator 61 employed in the second embodiment is formed into a shape filling the fixation hole 39A of the yoke 39 from inside using a magnetic material (a magnetic body) similarly to the stator 41 described in the above-described first embodiment. The stator 61 is formed as a short cylindrical annular member having an axially extending through-hole (not illustrated) on the central side thereof similarly to the stator 41 according to the first embodiment, and includes a circular recessed dented portion 61B, a conical protrusion portion 61C (the reduced diameter portion), and a side surface portion 61D. Then, an annular flange portion 61E protruding radially outward is integrally formed at a portion of this side surface portion 61D on one axial side of the stator 61.

However, in the stator 61 employed in the second embodiment, the side surface portion 61D thereof includes the flange portion 61E and a cylindrical portion 61F. Then, the cylindrical portion 61F of the stator 61 is formed to define a flat cylindrical shape to the position of the flange portion 61E along the outer periphery of the conical protrusion portion 61C (the reduced diameter portion). Then, a non-contact portion 62 is formed between the cylindrical portion 61F of the stator 61 and the fixation hole 39A of the yoke 39 while being located on the opposite axial side with respect to the flange portion 61E (the housing member 36 side). The cylindrical portion 61F of the stator 61 and the fixation hole 39A of the yoke 39 are out of contact with each other at the non-contact portion 62. This non-contact portion 62 is formed by an annular space defined between the fixation hole 39A of the yoke 39 and the cylindrical portion 61F of the stator 61 throughout the entire circumference.

Then, in the second embodiment configured in this manner, the non-contact portion 62, which is formed by the annular space extending throughout the entire circumference, is formed between the cylindrical portion 61F of the stator 61 and the fixation hole 39A of the yoke 39. Therefore, at the time of the work of assembling the solenoid 33, the present embodiment can facilitate smooth execution of the work of press-fitting (fixing) the stator 61 to the fixation hole 39A of the yoke 39 after joining the non-magnetic ring 44 between the housing member 36 and the yoke 39 by the brazing, and prevent the conical protrusion portion 61C (the reduced diameter portion) of the stator 61 from being deformed, for example, radially inward under an external force when being press-fitted.

Figure 6:
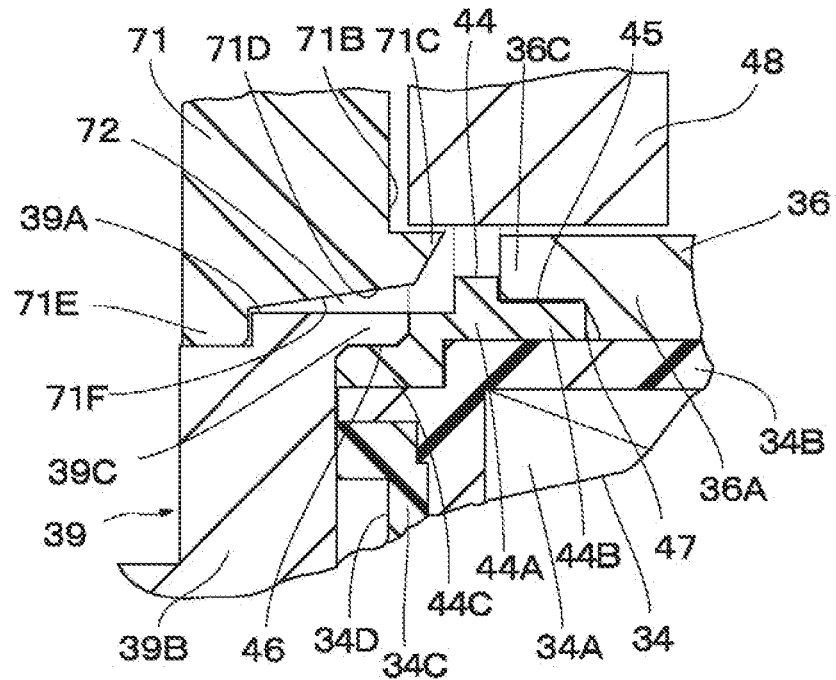
FIG. 6 is an enlarged view of main portions of a solenoid according to a third embodiment.

Next, FIG. 6 illustrates a third embodiment, and the present embodiment will be described identifying similar components to the above-described first embodiment by the same reference numerals and omitting the descriptions thereof. However, the third embodiment is characterized by being configured in such a manner that a stator 71 is fixed by being press-fitted in the fixation hole 39A of the yoke 39 instead of the stator 41 according to the first embodiment.

The stator 71 employed in the third embodiment is formed into a shape filling the fixation hole 39A of the yoke 39 from inside using a magnetic material (a magnetic body) similarly to the stator 41 described in the above-described first embodiment. The stator 71 includes a through-hole (not illustrated) on the central side, a circular recessed dented portion 71B, a conical protrusion portion 71C (the reduced diameter portion), and a side surface portion 71D, similarly to the stator 41 according to the first embodiment. Then, an annular flange portion 71E protruding radially outward is integrally formed at a portion of this side surface portion 71D on one axial side of the stator 71.

However, in the stator 71 employed in the third embodiment, the side surface portion 71D thereof includes the flange portion 71E and an inclined tubular portion 71F. Then, the inclined tubular portion 71F of the stator 71 is formed so as to define a tapering shape obliquely inclined to the position of the flange portion 71E along the outer periphery of the conical protrusion portion 71C (the reduced diameter portion). Then, a non-contact portion 72 is formed between the inclined tubular portion 71F of the stator 71 and the fixation hole 39A of the yoke 39 while being located on the opposite axial side with respect to the flange portion 71E (the housing member 36 side). The inclined tubular portion 71F of the stator 71 and the fixation hole 39A of the yoke 39 are out of contact with each other at the non-contact portion 72. This non-contact portion 72 is formed by an annular space V-shaped in cross section that is defined between the fixation hole 39A of the yoke 39 and the inclined tubular portion 71F of the stator 71 throughout the entire circumference.

Then, in the third embodiment configured in this manner, the non-contact portion 72, which is formed by the annular space V-shaped in cross section that extends throughout the entire circumference, is formed between the inclined tubular portion 71F of the stator 71 and the fixation hole 39A of the yoke 39. Therefore, at the time of the work of assembling the solenoid 33, the present embodiment can facilitate smooth execution of the work of press-fitting the stator 71 to the fixation hole 39A of the yoke 39 after joining the non-magnetic ring 44 between the housing member 36 and the yoke 39 by the brazing, and prevent the conical protrusion portion 71C (the reduced diameter portion) of the stator 71 from being deformed, for example, radially inward under an external force when being press-fitted.

Figure 7:
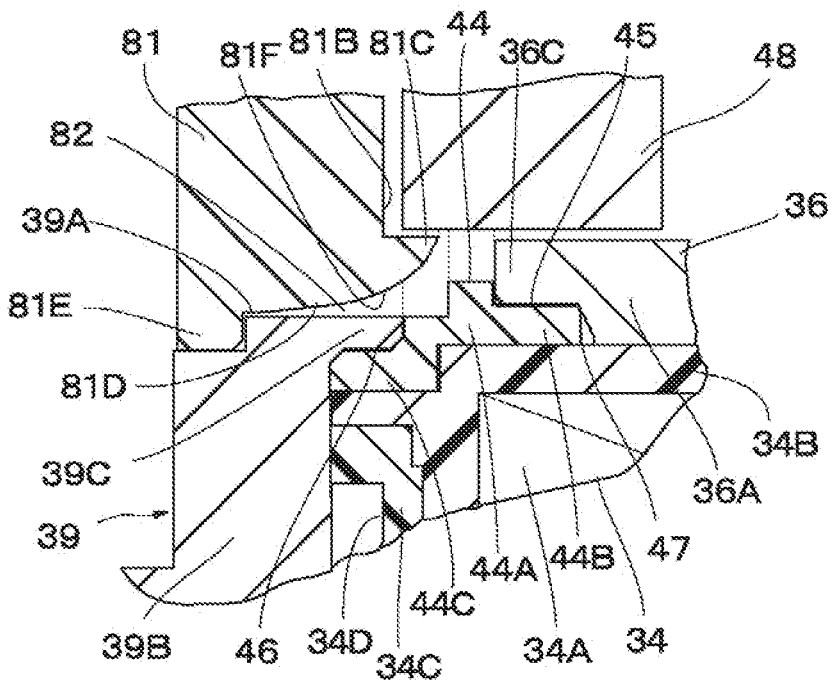
FIG. 7 is an enlarged view of main portions of a solenoid according to a fourth embodiment.

Next, FIG. 7 illustrates a fourth embodiment, and the present embodiment will be described identifying similar components to the above-described first embodiment by the same reference numerals and omitting the descriptions thereof. However, the fourth embodiment is characterized by being configured in such a manner that a stator 81 is fixed by being press-fitted in the fixation hole 39A of the yoke 39 instead of the stator 41 according to the first embodiment.

The stator 81 employed in the fourth embodiment is formed into a shape filling the fixation hole 39A of the yoke 39 from inside using a magnetic material (a magnetic body) similarly to the stator 41 described in the above-described first embodiment. The stator 81 includes a through-hole (not illustrated) on the central side, a circular recessed dented portion 81B, a conical protrusion portion 81C (the reduced diameter portion), and a side surface portion 81D, similarly to the stator 41 according to the first embodiment. Then, an annular flange portion 81E protruding radially outward is integrally formed at a portion of this side surface portion 81D on one axial side of the stator 81.

However, in the stator 81 employed in the fourth embodiment, the conical protrusion portion 81C (the reduced diameter portion) and the side surface portion 81D are formed as a circular-arc tapering surface 81F obliquely inclined in a circular-arc manner to the position of the flange portion 81E. In this case, the circular-arc tapering surface 81F is a circular-arc surface obliquely inclined from the conical protrusion portion 81C (the reduced diameter portion) of the stator 81 to the position of the flange portion 81E, and the portion between the conical protrusion portion 81C and the side surface portion 81D is formed so as to define a consistent circular-arc surface. Then, a non-contact portion 82 is formed between the side surface portion 81D of the stator 81 and the fixation hole 39A of the yoke 39 while being located on the opposite axial side with respect to the flange portion 81E (the housing member 36 side). The side surface portion 81D of the stator 81 and the fixation hole 39A of the yoke 39 are out of contact with each other at the non-contact portion 82. This non-contact portion 82 is formed by an annular space having a curved shape that is defined between the fixation hole 39A of the yoke 39 and the side surface portion 81D of the stator 81 throughout the entire circumference.

Then, in the fourth embodiment configured in this manner, the non-contact portion 82, which is formed by the annular space having the curved shape that extends throughout the entire circumference, is formed between the side surface portion 81D of the stator 81 and the fixation hole 39A of the yoke 39. Therefore, at the time of the work of assembling the solenoid 33, the present embodiment can facilitate smooth execution of the work of press-fitting (fixing) the stator 81 to the fixation hole 39A of the yoke 39 after joining the non-magnetic ring 44 between the housing member 36 and the yoke 39 by the brazing, and prevent the conical protrusion portion 81C (the reduced diameter portion) of the stator 81 and the like from being deformed, for example, radially inward under an external force when being press-fitted.

In the above-described first embodiment, the solenoid 33 has been described citing the example in which the stator 41 is fixed by being press-fitted in the fixation hole 39A of the yoke 39. However, the present invention is not limited thereto, and the solenoid 33 may be configured in such a manner that the stator 41 is fixed in the fixation hole 39A of the yoke 39 using a threaded engagement method such as a screw, a crimping method, or the like. The same also applies to the stators 61, 71, and 81 used in the second, third, and fourth embodiments, respectively.

Further, in each of the above-described embodiments, the solenoid 33 has been described citing the example in which the opposite-side tubular portion 39E is provided to the yoke 39 and the distal end side (the opposite axial side) of the opposite-side tubular portion 39E is fixed to the outer peripheral side of the cover member 51 by the crimped portion 39F. However, the present invention is not limited thereto, and the solenoid 33 may be configured in such a manner that, for example, the annular portion 39B and the opposite-side tubular portion 39E of the yoke 39 are formed on different members and this opposite-side tubular portion 39E is formed integrally with the cover member 51. Further, in the above-described embodiments, the solenoid 33 has been described citing the example in which the solenoid 33 is configured as a proportional solenoid. However, without being limited thereto, the solenoid 33 may be configured as, for example, an ON/OFF-type solenoid.

Next, an invention included in the above-described embodiments will be described. That is, according to a first configuration of the present invention, a solenoid includes a coil wound annularly and configured to generate a magnetic force in reaction to power supply, and a housing member disposed on an inner periphery of the coil. The housing member extends in a direction of a winding axis of the coil. The housing member includes a housing portion opened on one end side thereof, and is made from a magnetic body. The solenoid further includes a movable element provided in the housing portion movably in the direction of the winding axis of the coil and made from a magnetic body, and a stator provided at a position facing the opening of the housing portion. The stator includes a reduced diameter portion and a side surface portion integrally made from a magnetic body. The reduced diameter portion has an outer diameter reducing as it is approaching the opening of the housing portion. The side surface portion extends from an outer periphery of the reduced diameter portion in a direction away from the opening of the housing portion. The solenoid further includes a yoke including a fixation hole having an inner peripheral surface to which a part of the side surface portion of the stator is fixed. A non-contact portion, where the yoke and the side surface portion of the stator are out of contact with each other, is formed on the housing member side of the fixation hole.

According to a second configuration of the present invention, the solenoid according to the first configuration further includes a connection member joined by being heated between the housing member and the yoke, and made from a non-magnetic body. According to a third configuration of the present invention, in the solenoid according to the first or second configuration, a flange portion is formed on an end of the stator opposite from the housing portion, and a fixed portion of the side surface portion is a portion where the flange portion and the fixation hole face each other. According to a fourth configuration of the present invention, in the solenoid according to any of the first to third configurations, a stepped portion is formed on a surface where the side surface portion of the stator and the yoke face each other. According to a fifth configuration of the present invention, in the stator according to the fourth configuration, the stepped portion is formed on the reduced diameter portion side.

According to a sixth configuration of the present invention, a damping force adjustment mechanism includes a coil wound annularly and configured to generate a magnetic force in reaction to power supply, and a housing member disposed on an inner periphery of the coil. The housing member extends in a direction of a winding axis of the coil. The housing member includes a housing portion opened on one end side thereof, and is made from a magnetic body. The damping force adjustment mechanism further includes a movable element provided in the housing portion movably in the direction of the winding axis of the coil and made from a magnetic body, a control valve configured to be controlled according to a movement of the movable element, and a stator provided at a position facing the opening of the housing portion. The stator includes a reduced diameter portion and a side surface portion integrally made from a magnetic body. The reduced diameter portion has an outer diameter reducing as it is approaching the opening of the housing portion. The side surface portion extends from an outer periphery of the reduced diameter portion in a direction away from the opening of the housing portion. The damping force adjustment mechanism further includes a yoke including a fixation hole having an inner peripheral surface to which a part of the side surface portion of the stator is fixed. A non-contact portion, where the yoke and the side surface portion of the stator are out of contact with each other, is formed on the housing member side of the fixation hole.

According to a seventh configuration of the present invention, a damping force adjustable shock absorber includes a cylinder sealingly containing hydraulic fluid therein, a piston provided slidably in the cylinder, a piston rod coupled with the piston and extending out of the cylinder, and a damping force adjustment mechanism configured to generate a damping force by controlling a flow of the hydraulic fluid that is generated according to a sliding movement of the piston in the cylinder. The damping force adjustment mechanism includes a coil wound annularly and configured to generate a magnetic force in reaction to power supply, and a housing member disposed on an inner periphery of the coil. The housing member extends in a direction of a winding axis of the coil. The housing member includes a housing portion opened on one end side thereof, and is made from a magnetic body. The damping force adjustment mechanism further includes a movable element provided in the housing portion movably in the direction of the winding axis of the coil and made from a magnetic body, a control valve configured to be controlled according to a movement of the movable element, and a stator provided at a position facing the opening of the housing portion. The stator includes a reduced diameter portion and a side surface portion integrally made from a magnetic body. The reduced diameter portion has an outer diameter reducing as it is approaching the opening of the housing portion. The side surface portion extends from an outer periphery of the reduced diameter portion in a direction away from the opening of the housing portion. The damping force adjustment mechanism further includes a yoke including a fixation hole having an inner peripheral surface to which a part of the side surface portion of the stator is fixed. A non-contact portion, where the yoke and the side surface portion of the stator are out of contact with each other, is formed on the housing member side of the fixation hole.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2020-076114 filed on Apr. 22, 2020. The entire disclosure of Japanese Patent Application No. 2020-076114 filed on Apr. 22, 2020 including the specification, the claims, the drawings, and the abstract is incorporated herein by reference in its entirety.

REFERENCE SIGNS LIST 1 hydraulic shock absorber (damping force adjustable shock absorber)
4 inner tube (cylinder)
5 piston
8 piston rod
17 damping force adjustment mechanism
18 damping force adjustment valve (control valve)
32 pilot valve member (valve member)
33 solenoid
34 molded coil
34A coil
36 housing member
36A housing tubular portion (housing portion)
36B cover portion
39 yoke
39A fixation hole
39B annular portion
41, 61, 71, 81 stator
41B, 61B, 71B, 81B recessed dented portion
41C, 61C, 71C, 81C conical protrusion portion (reduced diameter portion)
41D, 61D, 71D, 81D side surface portion
41E, 61E, 71E, 81E flange portion
41F stepped portion
42, 62, 72, 82 non-contact portion
44 non-magnetic ring (connection member)
45, 46 brazed portion
48 movable element
49 actuation pin (shaft portion)
51 cover member
B rod-side oil chamber (rod-side chamber)
C bottom-side oil chamber (bottom-side chamber)
D annular oil chamber (flow passage)

The invention claimed is:
1. A solenoid comprising:
a coil wound annularly and configured to generate a magnetic force in reaction to power supply;
a housing member on an inner periphery of the coil, the housing member extending in a direction of a winding axis of the coil, and including a housing portion open on an end side thereof and being made from a magnetic body;
a movable element in the housing portion, the movable element being movable in the direction of the winding axis of the coil, and made from a magnetic body;
a stator at a position facing an opening of the housing portion, the stator including a reduced diameter portion and a side surface portion integrally made from a magnetic body, the reduced diameter portion having an outer diameter reducing toward the opening of the housing portion, the side surface portion extending from an outer periphery of the reduced diameter portion in a direction away from the opening of the housing portion; and
a yoke including a fixation hole having an inner peripheral surface to which a part of the side surface portion of the stator is fixed, the yoke being configured such that a non-contact portion is defined between the yoke and the side surface portion of the stator on a housing member side of the fixation hole,
wherein:
the non-contact portion is an annular space defined in an assembled state; and
at the non-contact portion, the yoke and the side surface portion of the stator are out of contact with each other.

2. The solenoid according to claim 1, further comprising a connection member joined by being heated between the housing member and the yoke, and made from a non-magnetic body.

3. The solenoid according to claim 1, wherein a flange portion is on an end of the stator opposite from the housing portion, and a fixed portion of the side surface portion of the stator is where the flange portion and the fixation hole face each other.

4. The solenoid according to claim 1, wherein a stepped portion is on a surface of the side surface portion of the stator where the yoke faces.

5. The solenoid according to claim 4, wherein the stepped portion is on a reduced diameter portion side.

6. A damping force adjustment mechanism comprising:
a coil wound annularly and configured to generate a magnetic force in reaction to power supply;
a housing member on an inner periphery of the coil, the housing member extending in a direction of a winding axis of the coil, and including a housing portion open on an end side thereof and being made from a magnetic body;
a movable element in the housing portion, the movable element being movable in the direction of the winding axis of the coil, and made from a magnetic body;
a control valve configured to be controlled according to a movement of the movable element;
a stator at a position facing an opening of the housing portion, the stator including a reduced diameter portion and a side surface portion integrally made from a magnetic body, the reduced diameter portion having an outer diameter reducing toward the opening of the housing portion, the side surface portion extending from an outer periphery of the reduced diameter portion in a direction away from the opening of the housing portion; and
a yoke including a fixation hole having an inner peripheral surface to which a part of the side surface portion of the stator is fixed, the yoke being configured such that a non-contact portion is defined between the yoke and the side surface portion of the stator on a housing member side of the fixation hole, wherein:
the non-contact portion is an annular space defined in an assembled state; and
at the non-contact portion, the yoke and the side surface portion of the stator are out of contact with each other.

7. A damping force adjustable shock absorber comprising:
a cylinder sealingly containing hydraulic fluid therein;
a piston which is slidable in the cylinder;
a piston rod coupled with the piston and extending out of the cylinder; and
a damping force adjustment mechanism configured to generate a damping force by controlling a flow of the hydraulic fluid that is generated according to a sliding movement of the piston in the cylinder,
wherein the damping force adjustment mechanism includes:
a coil wound annularly and configured to generate a magnetic force in reaction to power supply;
a housing member on an inner periphery of the coil, the housing member extending in a direction of a winding axis of the coil, and including a housing portion open on an end side thereof and being made from a magnetic body;
a movable element in the housing portion, the movable element being movable in the direction of the winding axis of the coil, and made from a magnetic body;
a control valve configured to be controlled according to a movement of the movable element;
a stator at a position facing an opening of the housing portion, the stator including a reduced diameter portion and a side surface portion integrally made from a magnetic body, the reduced diameter portion having an outer diameter reducing toward the opening of the housing portion, the side surface portion extending from an outer periphery of the reduced diameter portion in a direction away from the opening of the housing portion; and
a yoke including a fixation hole having an inner peripheral surface to which a part of the side surface portion of the stator is fixed, the yoke being configured such that a non-contact portion is defined between the yoke and the side surface portion of the stator on a housing member side of the fixation hole,
wherein:
the non-contact portion is an annular space defined in an assembled state; and
at the non-contact portion, the yoke and the side surface portion of the stator are out of contact with each other.

* * * * *